United States Patent
Maeda et al.

(10) Patent No.: US 7,995,275 B2
(45) Date of Patent: Aug. 9, 2011

(54) POLARIZATION CONVERSION ELEMENT, POLARIZATION CONVERSION OPTICAL SYSTEM AND IMAGE PROJECTING APPARATUS

(75) Inventors: Ikuo Maeda, Ohta-ku (JP); Kazuhiro Fujita, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 1131 days.

(21) Appl. No.: 11/665,619

(22) PCT Filed: Aug. 14, 2006

(86) PCT No.: PCT/JP2006/016276
§ 371 (c)(1),
(2), (4) Date: Apr. 18, 2007

(87) PCT Pub. No.: WO2007/021015
PCT Pub. Date: Feb. 22, 2007

(65) Prior Publication Data
US 2008/0278690 A1    Nov. 13, 2008

(30) Foreign Application Priority Data

Aug. 18, 2005  (JP) ................................ 2005-237496
Jun. 7, 2006   (JP) ................................ 2006-158217

(51) Int. Cl.
G02B 5/30      (2006.01)
G02B 27/28     (2006.01)

(52) U.S. Cl. ......... 359/485.01; 359/485.06; 359/489.06; 359/489.07; 359/489.16; 359/489.17

(58) Field of Classification Search ................ 359/487, 359/495, 497, 485.01, 485.06, 489.06, 489.07, 359/489.16, 489.17
See application file for complete search history.

(56) References Cited

U.S. PATENT DOCUMENTS

| | | | | |
|---|---|---|---|---|
| 2,748,659 A * | 6/1956 | Schroder et al. | ............. | 359/487 |
| 5,283,600 A * | 2/1994 | Imai | ................................. | 353/34 |
| 5,555,186 A * | 9/1996 | Shioya | ............................... | 349/9 |
| 5,729,306 A * | 3/1998 | Miyake et al. | ..................... | 349/9 |
| 5,764,412 A * | 6/1998 | Suzuki et al. | ................... | 359/487 |
| 6,053,615 A | 4/2000 | Peterson et al. | | |
| 6,067,193 A * | 5/2000 | Sekine et al. | ................... | 359/489 |
| 6,144,492 A * | 11/2000 | Iwamura et al. | ................. | 359/487 |
| 6,373,629 B1 * | 4/2002 | Yamagishi et al. | ............. | 359/487 |
| 6,404,550 B1 * | 6/2002 | Yajima | ............................ | 359/487 |
| 6,411,438 B1 * | 6/2002 | Itoh et al. | ....................... | 359/497 |
| 6,588,905 B2 * | 7/2003 | Sekine | ............................ | 353/20 |
| 6,803,972 B1 | 10/2004 | Budd et al. | | |

(Continued)

FOREIGN PATENT DOCUMENTS

DE   1 092 686   11/1960

(Continued)

*Primary Examiner* — Ricky D Shafer
(74) *Attorney, Agent, or Firm* — Oblon, Spivak, McClelland, Maier & Neustadt, L.L.P.

(57) ABSTRACT

A polarization conversion element having plural polarization separation sections and plural phase modulation sections is disclosed. A light flux is separated into transmission light (P polarization) and reflection light (S polarization) by being input to a polarization separation section. The reflection light reflected at the polarization separation section is output in the same direction as that of the transmission light by being reflected again at an adjacent polarization separation section at a different position from a position where a light flux is input to the adjacent polarization separation section. The phase modulation section is disposed on an optical path of the transmission light or the reflection light and output light becomes the same polarization.

1 Claim, 21 Drawing Sheets

U.S. PATENT DOCUMENTS

| | | | |
|---|---|---|---|
| 7,529,024 B1 * | 5/2009 | Chen | 359/487 |
| 2003/0107808 A1 * | 6/2003 | Sawamura | 359/487 |

FOREIGN PATENT DOCUMENTS

| | | |
|---|---|---|
| EP | 0840 145 A1 | 5/1998 |
| EP | 1 031 869 A2 | 8/2000 |
| JP | 11 64850 | 3/1999 |
| JP | 11 202129 | 7/1999 |
| JP | 2000 194068 | 7/2000 |
| JP | 2000 321535 | 11/2000 |
| JP | 3273955 | 2/2002 |
| JP | 2002 90884 | 3/2002 |
| JP | 3371291 | 11/2002 |
| JP | 2003 14932 | 1/2003 |
| JP | 2003 29032 | 1/2003 |
| JP | 2003 75916 | 3/2003 |
| JP | 2003-84285 | 3/2003 |
| JP | 2003 185975 | 7/2003 |
| JP | 2003 207643 | 7/2003 |
| JP | 2004 45767 | 2/2004 |
| JP | 2004-170677 | 6/2004 |
| JP | 2004 240021 | 8/2004 |
| TW | 442692 B | 6/2001 |
| TW | 528895 B | 4/2003 |
| TW | 548430 B | 8/2003 |

* cited by examiner (m−1)$^{th}$ LIGHT FLUX (a)

(b)

(c)

POLARIZATION CONVERSION ELEMENT, POLARIZATION CONVERSION OPTICAL SYSTEM AND IMAGE PROJECTING APPARATUS

TECHNICAL FIELD

The present invention generally relates to a polarization conversion element which is used in an image projecting apparatus of transmission type or reflection type, a polarization conversion optical system which uses the polarization conversion element, and an image projecting apparatus which uses the polarization conversion optical system.

BACKGROUND ART

In a liquid crystal image forming element which is used in an image projecting apparatus, a polarization component of one direction is only effectively utilized and a polarization component of the other direction orthogonal to the above direction causes degradation of contrast. Therefore, the polarization direction is controlled by disposing a polarizer at the front stage and the back stage of the liquid crystal image forming element. However, light beams emitted from a light source are non-polarization beams whose polarization directions are not the one direction. Therefore, when the polarization component of the one direction is selected by a polarizer, light quantity also becomes a half.

In order to solve this problem, a polarization conversion element, which efficiently causes the non-polarization beams emitted from the light source to be light beams in one direction, is generally disposed in the front stage of the polarizer. In the polarization conversion element, the non-polarization beams are basically separated into P polarization and S polarization by a polarization beam splitter, and one of the direction of the separated polarization is rotated by 90° by a method and the directions of both the polarization are made to be the same direction. Consequently, the directions of both the beams become equal (refer to, for example, Patent document 1).

There are generally two methods that rotate the polarization direction of one of the separated polarization. In a first method, a ½ wavelength plate is used, that is, refractive index difference between the two directions is used. In a second method, two mirrors are used, that is, the reflection directions of the two mirrors are suitably determined while the separated light beams are reflected by the two mirrors, and the directions of the total beams are made the same directions. In the second method, since the reflection by the mirrors is used, the conversion can be efficiently performed regardless of wavelengths; however, since illumination beams from the image projecting apparatus have a certain thickness, the size of the polarization conversion element which uses the mirrors becomes large and also it is not easy to form an optical system which combines the separated beams. When the polarization conversion element is divided into many pieces and the many pieces are arrayed, the polarization conversion element can be thin; however, arraying the mirrors is logically possible, but actually difficult. On the other hand, in the first method, since the ½ wavelength plate is used, it is easy to array the ½ wavelength plates. In addition, since a fly-eye lens which is disposed on the illumination optical path of the image projecting apparatus can be used with the ½ wavelength plate, the second method is generally used.

FIG. 27 is a diagram showing a transmission type liquid crystal image projecting apparatus. FIG. 28 is a diagram showing a reflection type liquid crystal image projecting apparatus. Both the types use a liquid crystal image forming element and have polarization selectivity. Further, in both types, almost the same illumination optical system is used.

First, operations of the transmission type liquid crystal image projecting apparatus shown in FIG. 27 are described. Non-polarization beams emitted from a light source 1001 such as a white lamp become approximately parallel beams at a reflector 1002 and the approximately parallel beams are input in an optical integrator 1003. The optical integrator 1003 makes illuminance of light which is irradiated on an image forming element uniform and is composed of a pair of fly-eye lenses 1003-1 and 1003-2. A fly-eye lens is a lens array in which lenses are arrayed in the length and width directions. Each lens in the fly-eye lens has an analogous shape with an image forming element.

A light beam transmitted through each lens in the first fly-eye lens 1003-1 is projected on an image forming element by the second fly-eye lens 1003-2 and a condenser lens 1005 disposed behind the second fly-eye lens 1003-2. With this, the illuminance distribution on the image forming element is made uniform.

Light beams output from the optical integrator 1003 are input in a polarization conversion element 1004. In the polarization conversion element 1004, polarization beam splitters, reflection film surfaces, ½ wavelength plates, and so on are arrayed corresponding to the pitch of the fly-eye lens. The polarization conversion element 1004 efficiently converts the non-polarization beams into light beams in one polarization direction. The light beams output from the polarization conversion element 1004 are transmitted through the condenser lens 1005 and are reflected by a reflection mirror 1006, and the reflected light beams are separated into red light beams, green light beams, and blue light beams by dichroic mirrors 1007 and 1008. The separated light beams are irradiated on the image forming elements.

For example, light beams transmitted through the first dichroic mirror 1007 are reflected by a mirror 1009 and the reflected light beams are irradiated on a liquid crystal element for red 1015-1 by being transmitted through a condenser lens for red 1014-1. Light beams reflected by the first dichroic mirror 1007 are reflected by a second dichroic mirror 1008 and the reflected light beams are irradiated on a liquid crystal element for green 1015-2 by being transmitted through a condenser lens for green 1014-2. Light beams transmitted through the second dichroic mirror 1008 are irradiated on a liquid crystal element for blue 1015-3 by being transmitted through a condenser lens for blue 1014-3 via a lens 1010, a mirror 1011, a lens 1012, and a mirror 1013.

The liquid crystal elements 1015-1, 1015-2, and 1015-3 are image forming elements and modulate the corresponding light beams based on image signals of red, green, and blue components. The light beams transmitted through the liquid crystal elements 1015-1, 1015-2, and 1015-3 are made composite light beams by a color composite prism 1016 and the composite light beams are projected on a screen 1018 by a projection lens 1017.

Operations of the reflection type liquid crystal image projecting apparatus shown in FIG. 28 are basically the same as those described in FIG. 27. However, the polarization light beams reflected by the reflection mirror 1006 are separated into red, green, and blue polarization light beams by an optical system composed of a dichroic prism 1021, mirrors 1022 and 1023, and a dichroic mirror 1024. The red polarization light beams are transmitted through a polarization beam splitter for red 1025-1 and a reflection type liquid crystal for red 1026-1, the green polarization light beams are transmitted through a polarization beam splitter for green 1025-2 and a reflection type liquid crystal for green 1026-2, and the blue polarization light beams are transmitted through a polarization beam splitter for blue 1025-3 and a reflection type liquid crystal for blue 1026-3. The transmitted through polarization light beams are made composite light beams by the color composite prism 1016. The above operations are different from those in FIG. 27.

FIG. 29A is a diagram showing a polarization conversion element which is used in a liquid crystal image projecting apparatus. FIG. 29B is a diagram showing another polarization conversion element which is used in a liquid crystal image projecting apparatus.

In the polarization conversion element shown in FIG. 29A, a unit 2020 is composed of a polarization separation film 2021, a reflection film 2022, and a ½ wavelength plate 2023. The units 2020 are arrayed to accommodate the pitch of a fly-eye lens 2000. The polarization separation film 2021 has the gradient of 45° for the input light axis and the reflection film 2022 is disposed parallel to the polarization separation film 2021. Each light beam 2010 output from the fly-eye lens 2000 is input in each unit 2020 and is separated into transmission light (P polarization) and reflection light (S polarization) by the polarization separation film 2021, and the reflection light is further reflected by the reflection film 2022 and becomes a light beam parallel to the transmission light. The polarization direction of either of the transmission light (P polarization) or the reflection light (S polarization) is rotated by the ½ wavelength plate 2023 and the polarization directions become equal. In this case, the reflection light (S polarization) is rotated. With this, the light beams 2010 which are non-polarization at the input time are converted into light beams having the same polarization direction. In FIG. 29B, the reflection film 2022 shown in FIG. 29A is replaced by a polarization separation film 2024 similar to the polarization separation film 2021, and operations are almost the same as those in FIG. 29A.

[Patent Document 1] Japanese Patent No. 3492355

In the polarization conversion element shown in FIGS. 29A and 29B, a non-polarization beam can be efficiently converted into a light beam having one polarization direction. However, in the polarization conversion element shown in FIG. 29A, two surfaces are needed, that is, the polarization separation surface and the reflection surface are required for one pitch of the fly-eye lens. In other words, two blocks are needed, that is, a block in which the polarization separation surface is formed and a block in which the reflection surface is formed are required. Consequently, twice as many blocks as the number of lenses in the fly-eye lens must be bonded. Therefore, many man-hours are required. In the actual mass-production, a glass plate on which the polarization separation film is formed and a glass plate on which the reflection film is formed are alternately bonded and the bonded product is cut in the direction of 45° for the bonded surface and polished. That is, two kinds of glass plates are prepared and twice (+both ends) as many bonding times as the number of the lenses in the fly-eye lens are needed.

Therefore, as described above, the many man hours are required. As shown in FIG. 29B, the polarization separation film can also work as the reflection film; however, two films (surfaces) are also needed for one lens in the fly-eye lens, and the number of bonding times of glass plates cannot be reduced.

DISCLOSURE OF THE INVENTION

The present invention solves one or more of the problems in the conventional technologies. According to an embodiment of the present invention, there is provided a polarization conversion element, a polarization conversion optical system using the polarization conversion element, and an image projecting apparatus using the polarization conversion optical system in which the number of bonding times in manufacturing the polarization conversion element is decreased and productivity in manufacturing the polarization conversion element is increased.

According one aspect of the present invention, there is provided a polarization conversion element. The polarization conversion element includes plural polarization separation sections and plural phase modulation sections. A light flux is separated into transmission light (P polarization) and reflection light (S polarization) by being input to each of the polarization separation sections. The reflection light reflected at the polarization separation section is output in the same direction as that of the transmission light by being reflected again at an adjacent polarization separation section at a different position from a position where a light flux is input to the adjacent polarization separation section. The phase modulation section is disposed on an optical path of the transmission light or the reflection light and output light becomes the same polarization. When the incidence angle relative to the polarization separation section is determined as 45°±some degrees, for example, approximately 30° or 60°, the light reflection position and the light input position at the adjacent polarization separation section are different.

According to another aspect of the present invention, the phase modulation sections are disposed on the light output surface with approximately the same pitch. In addition, according to another aspect of the present invention, the phase modulation sections are disposed parallel to the polarization separation sections on an approximately half region of the polarization separation sections so as to face the polarization separation sections. Further, according to another aspect of the present invention, the phase modulation sections are adjacently disposed parallel to the polarization separation sections with second phase modulation sections disposed parallel to the phase modulation sections and the polarization separation sections.

In addition, according to another aspect of the present invention, a light blocking unit is disposed so as to block unnecessary light other than light on effective light paths on the light input surface. Further, the polarization conversion elements are disposed in central symmetry.

According to another aspect of the present invention, there is provided a polarization conversion optical system. The polarization conversion optical system includes the above polarization conversion element and lenticular lens arrays or fly-eye lenses whose lens pitch is the same arraying pitch as that of the polarization separation sections of the polarization conversion element. The lenticular lens arrays or the fly-eye lenses are disposed in front of the polarization conversion element, and a light flux transmitted through the $i^{th}$ lenses in the lenticular lens arrays or the fly-eye lenses is input to the $i^{th}$ polarization separation section.

According to another aspect of the present invention, there is provided an image projecting apparatus which projects an image of an image forming element having polarization dependency by a projecting optical system. The image projecting apparatus includes the above polarization conversion element on optical paths of an illumination system which illuminates the image forming element.

According to embodiments of the present invention, in a polarization conversion element, a polarization separation section separates an input light flux into transmission light (P polarization) and reflection light (S polarization) and also reflects the reflection light reflected from an adjacent polarization separation section in the same direction as that of the transmission light. Therefore, a reflection film (separation film) which is needed only for reflection in a conventional polarization conversion element is not required. Consequently, almost the same effect as that in the conventional polarization conversion element can be obtained by disposing only the polarization separation sections having the same pitch as that of a lens in a lenticular lens array or a fly-eye-lens, and the pitch can be twice as many as that in the conventional polarization conversion element. With this, productivity can be increased. In addition, since the polarization separation section can be disposed parallel to the phase modulation section, the polarization separation section can be closely disposed on the phase modulation section. Therefore, the polarization separation section can be disposed at high accuracy and manufacturing the polarization conversion element becomes easy.

In addition, a polarization conversion optical system having low losses of light quantity can be formed by combining the polarization conversion element with lenticular lens arrays or fly-eye lenses. Further, an image projecting apparatus can be realized by only using the above polarization conversion element or the above polarization conversion optical system without changing the conventional optical system.

The features and advantages of the present invention will become more apparent from the following detailed description of preferred embodiments given with reference to the accompanying drawings.

BEST MODE FOR CARRYING OUT THE INVENTION

Figure 1:
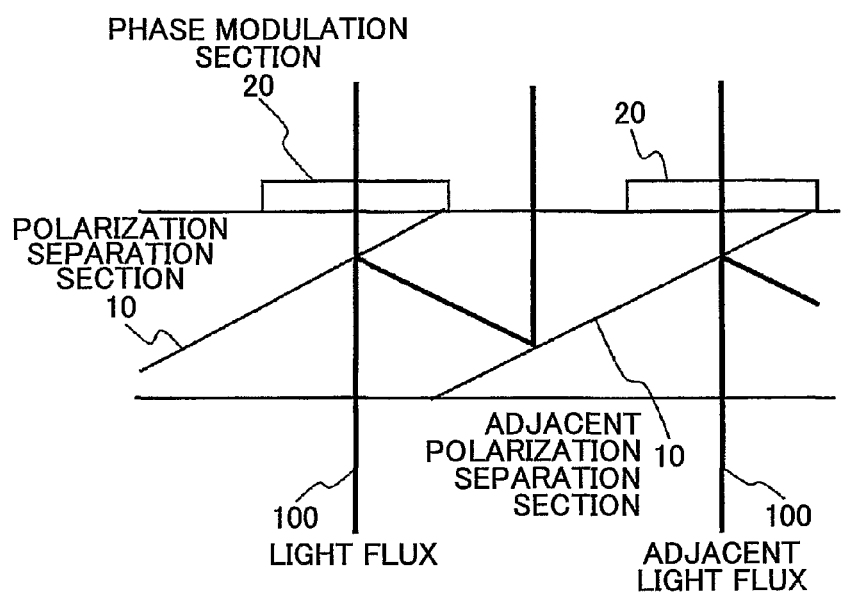
FIG. 1 is a diagram showing a structure of a polarization conversion element according to an embodiment of the present invention.

Next, referring to the drawings, embodiments of the present invention are described in detail.

FIG. 1 is a diagram showing a structure of a polarization conversion element according to an embodiment of the present invention. The polarization conversion element according to the embodiment of the present invention provides plural polarization separation sections 10 and plural phase modulation sections 20. A light flux 100 is input to each polarization separation section 10 and is separated into transmission light and reflection light whose polarization direction is different from that of the transmission light. When the polarization separation section 10 is formed by a general multi-layer polarization separation film, the transmission light becomes P polarization and the reflection light becomes S polarization. The reflection light reflected at the polarization separation section 10 is reflected again at an adjacent polarization separation section 10 and becomes a light flux parallel to the transmission light. At this time, an adjacent light flux 100 is input to the adjacent polarization separation section 10. However, when the position where the adjacent light flux 100 is input to the front surface of the adjacent polarization separation section 10 is shifted from the position where the reflection light is input to the back surface of the adjacent polarization separation section 10, outputting positions of the transmission light and the reflection light can be shifted from each other. When the angle of the input light flux 100 for the optical axis of the polarization separation section 10 is determined to be 45°±some degrees, the output position of the transmission light is shifted from the output position of the reflection light. The phase modulation section 20 is disposed on the optical path of the transmission light and the transmission light (P polarization) becomes the S polarization equal to the reflection light. In this, the multi-layer polarization separation film can be formed so that the transmission light becomes S polarization and the reflection light becomes P polarization.

Figure 2:
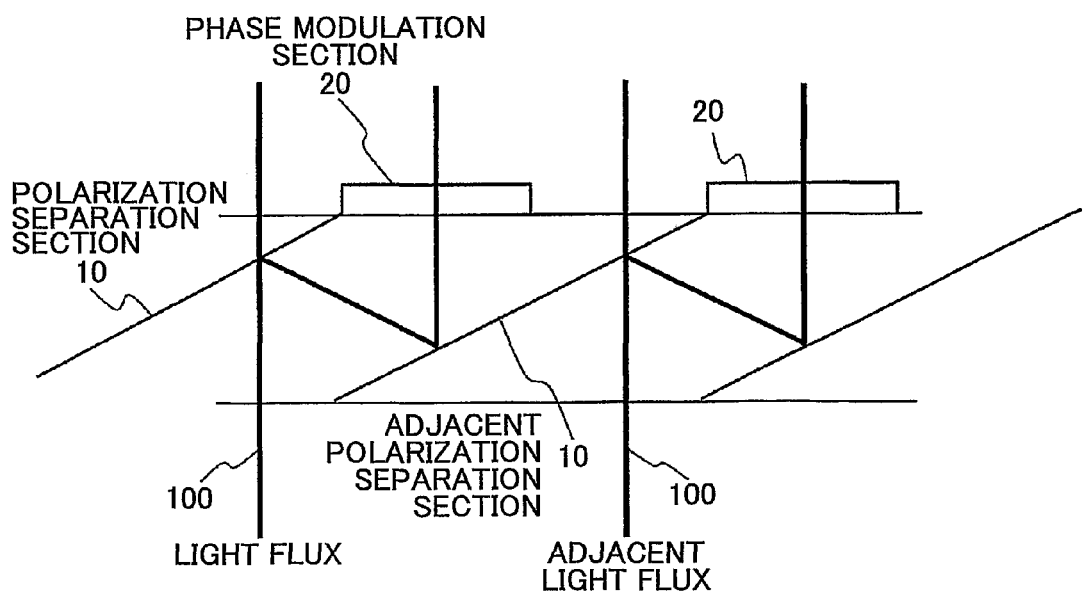
FIG. 2 is a diagram showing another structure of a polarization conversion element according to the embodiment of the present invention.

FIG. 2 is a diagram showing another structure of a polarization conversion element according to an embodiment of the present invention. In the polarization conversion element, the phase modulation section 20 is disposed on the optical path of the reflection light and the reflection light becomes the same polarization direction as that of the transmission light. The operations shown in FIG. 2 are the same as those in FIG. 1.

Figure 29A:
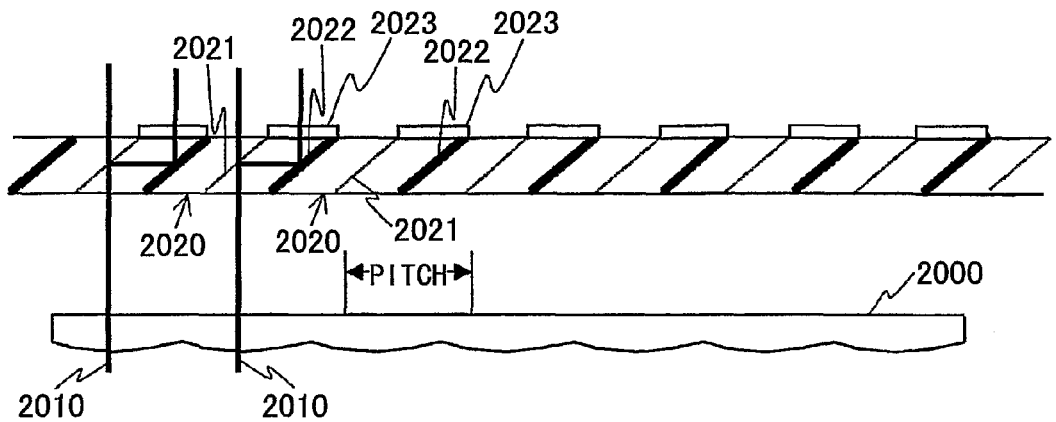
FIG. 29A is a diagram showing a polarization conversion element which is used in a liquid crystal image projecting apparatus.
Figure 29B:
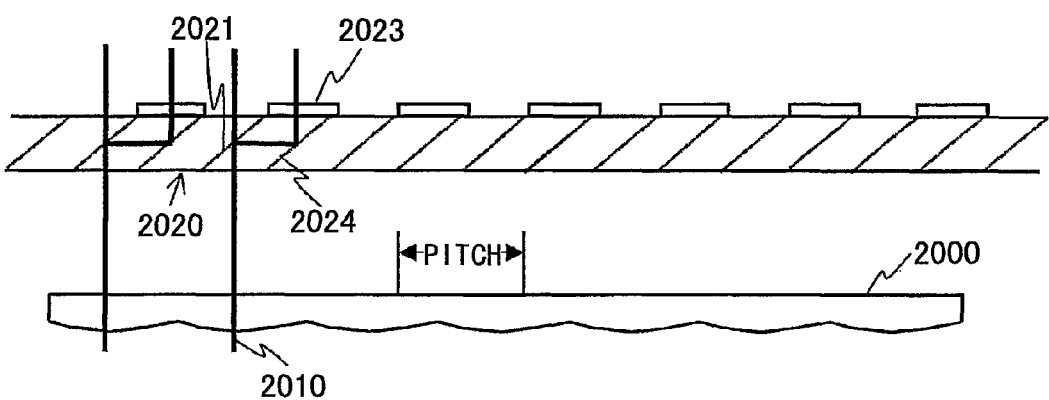
FIG. 29B is a diagram showing another polarization conversion element which is used in a liquid crystal image projecting apparatus.
Figure 29C:
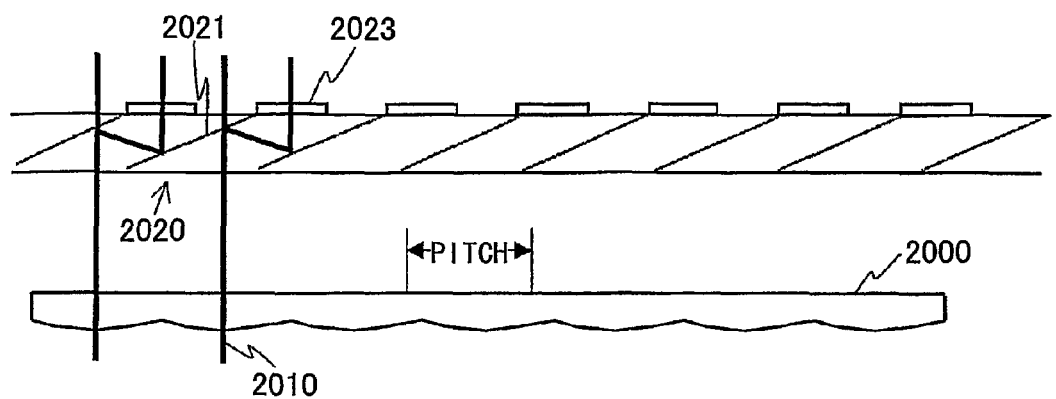
FIG. 29C is a diagram showing a polarization conversion element according to the embodiments of the present invention.

FIG. 29C is a diagram showing a polarization conversion element according to an embodiment of the present invention. As shown in FIG. 29C, the polarization separation film 2021 having the same pitch as that of the lens in the fly-eye lens 2000 is only disposed without using the reflection film 2022 shown in FIG. 29A. By the above structure, the same function as that shown in FIGS. 29A and 29B can be obtained. Therefore, the number of glass plates to be bonded on which glass plate the polarization separation section 10 is formed is decreased to almost a half of that shown in FIGS. 29A and 29B.

Consequently, the polarization conversion element can be easily manufactured. That is, the reflection surface (reflection film or separation film used only for reflection) which is conventionally needed is not necessary in the embodiments of the present invention. The pitch of the polarization separation film 2021 can be the same as that of the lens in the fly-eye lens; therefore, the productivity can be increased. In addition, in FIG. 29C, the ½ wavelength plate 2023 is disposed on the optical path of the reflection light; however, the ½ wavelength plate 2023 can be disposed on the polarization separation film 2021 (described below in detail).

Figure 3:
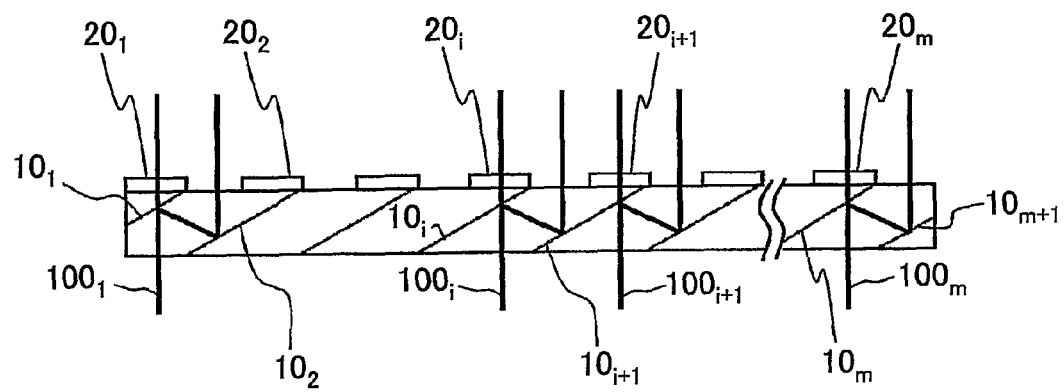
FIG. 3 is a diagram showing a first basic structure of a polarization conversion element according to a first embodiment of the present invention.
Figure 4:
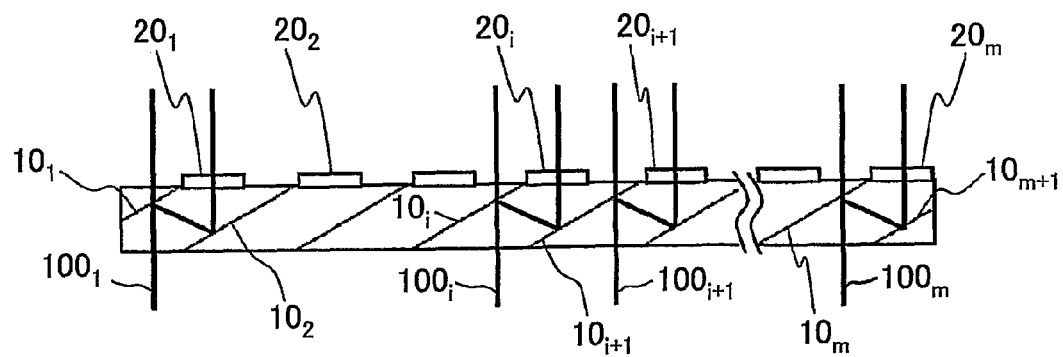
FIG. 4 is a diagram showing a second basic structure of the polarization conversion element according to the first embodiment of the present invention.

FIG. 3 is a diagram showing a first basic structure of a polarization conversion element according to a first embodiment of the present invention. FIG. 4 is a diagram showing a second basic structure of the polarization conversion element according to the first embodiment of the present invention.

Figure 5:
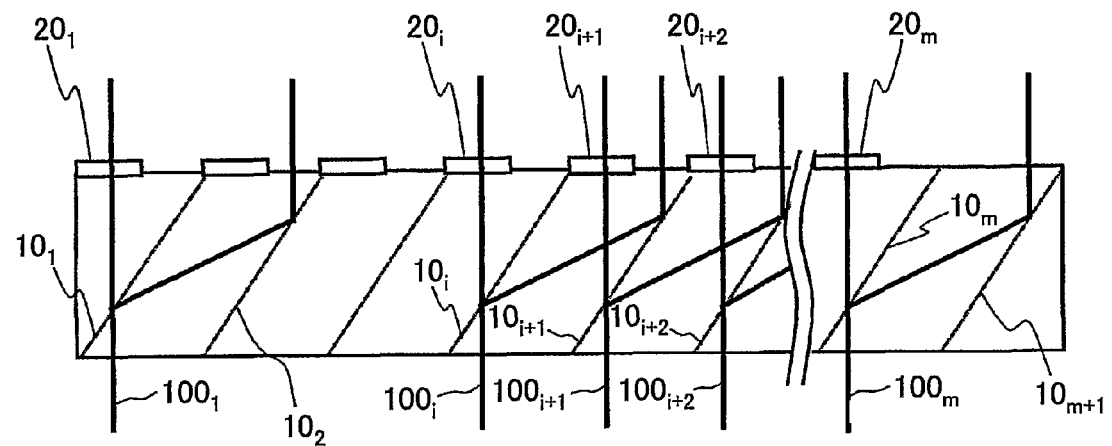
FIG. 5 is a diagram showing a third basic structure of the polarization conversion element according to the first embodiment of the present invention.
Figure 6:
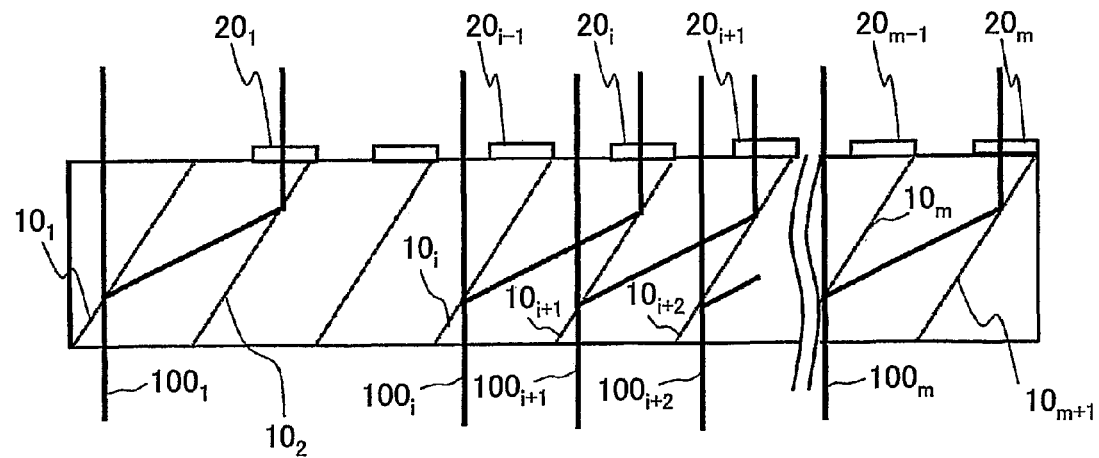
FIG. 6 is a diagram showing a fourth basic structure of the polarization conversion element according to the first embodiment of the present invention.

FIG. 5 is a diagram showing a third basic structure of the polarization conversion element according to the first embodiment of the present invention. FIG. 6 is a diagram showing a fourth basic structure of the polarization conversion element according to the first embodiment of the present invention.

In FIGS. 3 through 6, the polarization conversion element is formed by arraying plural polarization conversion sections, and the polarization conversion element provides "m+1" polarization separation sections 10 (in some cases, hereinafter referred to as polarization separation films or elements) and "m" phase modulation sections 20 for "m" light fluxes 100. In this, "m" is an integer being 2 or more. Specifically, plural parallelogram blocks (plural polarization conversion sections) whose lower surface to which light is input and upper surface from which light is output are orthogonal to the optical axis of an input light flux 100, and whose bonding surface to an adjacent block has a gradient of either approximately 60° relative to the optical axis of the input light flux (incidence angle of approximately 30° relative to the bonding surface) or of approximately 30° relative to the optical axis of the input light flux (incidence angle of approximately 60° relative to the bonding surface), are arrayed. In this, the parallelogram blocks disposed at both the ends of the polarization conversion element have suitable shapes by being cut. The polarization separation film 10 is formed at the bonding surface. The phase modulation section 20 (in some cases, hereinafter referred to as a phase modulation film or element) is disposed either at an approximately right-half region (FIG. 3, for example) or an approximately left-half region (FIG. 4, for example) of the light output surface in each block.

In FIG. 3, an array of parallelogram blocks which are disposed with the same pitch as that of an input light flux is shown. The bonding surface of the block is approximately 60° relative to the optical axis of the input light flux (incidence angle is approximately 30°). The polarization separation film 10 is formed in each parallelogram block and the light input surface and the light output surface to/from the parallelogram block are disposed orthogonal to the optical axis of the light flux 100. The phase modulation element 20 is disposed at the approximately right-half region of the light output surface of the parallelogram block.

The light flux 100 is input to the lower surface of the parallelogram block at the position where the phase modulation element 20 is disposed at the opposite side (i.e. upper surface) of the block. The $i^{th}$ light flux $100_i$ is separated into transmission light and reflection light at the $i^{th}$ polarization separation film $10_i$. In a general polarization separation film, the transmission light becomes P polarization and the reflection light becomes S polarization.

The transmission light (P polarization) transmitted through the $i^{th}$ polarization separation film $10_i$ is converted into S polarization by the phase modulation element $20_i$ and the S polarization is output. The phase modulation element $20_i$ may be a ½ wavelength plate, for example. The reflection light (S polarization) reflected from the $i^{th}$ polarization separation film $10_i$ is reflected again by the $(i+1)^{th}$ polarization separation film $10_{i+1}$ and becomes a light flux parallel to the transmission light. The $(i+1)^{th}$ light flux $100_{i+1}$ is separated into transmission light (P polarization) and reflection light (S polarization) at the $(i+1)^{th}$ polarization separation film $10_{i+1}$. When the incidence angle of the light flux 100 for the polarization separation film 10 is set to be approximately 30° (as shown in FIG. 3, for example), the $i^{th}$ reflection light is output at an approximately middle position between the $i^{th}$ transmission light and the $i+1^{th}$ transmission light. Since the phase modulation element 20 is not disposed for the reflection light, the reflection light is output as the S polarization as it is. Other reflection light (S polarization) is the same as the above reflection light. Therefore, light fluxes, 100 input to the $1^{st}$ through $m^{th}$ polarization separation films 10 as non-polarization are output as the S polarization.

In FIG. 4, another embodiment of an array of parallelogram blocks which are disposed with the same pitch as that of an input light flux is shown. The bonding surface of the block is approximately 60° relative to the optical axis of the input light flux (incidence angle is approximately 30°). The polarization separation film 10 is formed in each parallelogram block and the light input surface and the light output surface to/from the parallelogram block are disposed orthogonal to the optical axis of the light flux 100. However, it is different from that shown in FIG. 3 in that the phase modulation element 20 is disposed at the approximately left-half region of the light output surface of each parallelogram block.

The light flux 100 is input to the lower surface of each parallelogram block at the position where the phase modulation element 20 is not disposed at the opposite side, (i.e. upper surface) of the block. The $i^{th}$ light flux $100_i$ is separated into transmission light (P polarization) and reflection light (S polarization) at the $i^{th}$ polarization separation film $10_i$. The transmission light (P polarization) is transmitted through the $i^{th}$ polarization separation film $10_i$ as it is. The reflection light (S polarization) reflected from the $i^{th}$ polarization separation film $10_i$ is reflected again by the $(i+1)^{th}$ polarization separation film $10_{i+1}$ and becomes a light flux parallel to the transmission light. The $(i+1)^{th}$ light flux $100_{i+1}$ is separated into transmission light (P polarization) and reflection light (S polarization) at the $(i+1)^{th}$ polarization separation film $10_{i+1}$. When the incidence angle of the light flux 100 for the polarization separation film 10 is set to be approximately 30° (as shown in FIG. 4, for example), the $i^{th}$ reflection light is output at an approximately middle position between the $i^{th}$ transmission light and the $(i+1)^{th}$ transmission light. Since the phase modulation element $20_i$ such as a ½ wavelength plate is disposed for the reflection light, the reflection light is converted into P polarization and is output. Other reflection light (S polarization) is the same as the above reflection light. Therefore, light fluxes 100 input to the $1^{st}$ through $m^{th}$ polarization separation films 10 as non-polarization are output as the P polarization.

In FIG. 5, another embodiment of an array of parallelogram blocks which are disposed with the same pitch as that of an input light flux is shown. The bonding surface of the block is approximately 30° relative to the optical axis of the input light flux (incidence angle is approximately 60°). The polarization separation film 10 is formed in each parallelogram block and the light input surface and the light output surface to/from the parallelogram block are disposed orthogonal to the optical axis of the light flux 100. The phase modulation element 20 is disposed at the approximately left-half region of the light output surface of the parallelogram block.

The light flux 100 is input to the lower surface of the parallelogram block at the position where the phase modulation element 20 is disposed at the opposite side (i.e. upper surface) of the block. The $i^{th}$ light flux $100_i$ is separated into transmission light (P polarization) and reflection light (S polarization) at the $i^{th}$ polarization separation film $10_i$. The transmission light (P polarization) transmitted through the $i^{th}$ polarization separation film $10_i$ is converted into S polarization by the phase modulation element $20_i$ such as a ½ wavelength plate and the S polarization is output. The reflection light (S polarization) reflected from the $i^{th}$ polarization separation film $10_i$ is reflected again by the $(i+1)^{th}$ polarization separation film $10_{i+1}$ and becomes a light flux parallel to the transmission light. The $(i+1)^{th}$ light flux $100_{i+1}$ is separated into transmission light (P polarization) and reflection light (S polarization) at the $(i+1)^{th}$ polarization separation film $10_{i+1}$. The $(i+2)^{th}$ light flux $100_{i+2}$ is separated into transmission light (P polarization) and reflection light (S polarization) at the $(i+2)^{th}$ polarization separation film $10_{i+2}$. When the incidence angle of the light flux 100 for the polarization separation film 10 is set to be approximately 60° (as shown in FIG. 5, for example), the $i^{th}$ reflection light is output at an approximately middle position between the $(i+1)^{th}$ transmission light and the $(i+2)^{th}$ transmission light. Since the phase modulation element 20 is not disposed for the reflection light, the reflection light is output as the S polarization as it is. Other reflection light (S polarization) is the same as the above reflection light. Therefore, light fluxes 100 input to the $1^{st}$ through $m^{th}$ polarization separation films 10 as non-polarization are output as the S polarization. In this, in the parallelogram block, the transmission light crosses the reflection light from the front stage; however, since the optical axes are different from each other, there is no problem.

In FIG. 6, another embodiment of an array of parallelogram blocks which are disposed with the same pitch as that of an input light flux is shown. The bonding surface of the block is approximately 30° relative to the optical axis of the input light flux (incidence angle is approximately 60°). The polarization separation film 10 is formed in each parallelogram block and the light input surface and the light output surface to/from the parallelogram block are disposed orthogonal to the optical axis of the light flux 100. However, it is different from that shown in FIG. 5 in that the phase modulation element 20 is disposed at the approximately right-half region of the light output surface of each parallelogram block.

The light flux 100 is input to the lower surface of each parallelogram block at the position where the phase modulation element 20 is not disposed at the opposite side (i.e. upper surface) of the block. The $i^{th}$ light flux $100_i$ is separated into transmission light (P polarization) and reflection light (S polarization) at the $i^{th}$ polarization separation film $10_i$. The transmission light (P polarization) transmitted through the $i^{th}$ polarization separation film $10_i$ is output as the P polarization as it is. The reflection light (S polarization) reflected from the $i^{th}$ polarization separation film $10_i$ is reflected again by the $(i+1)^{th}$ polarization separation film $10_{i+1}$ and becomes a light flux parallel to the transmission light. The $(i+1)^{th}$ light flux $100_{i+1}$ is separated into transmission light (P polarization) and reflection light (S polarization) at the $(i+1)^{th}$ polarization separation film $10_{i+1}$. The $(i+2)^{th}$ light flux $100_{i+2}$ is separated into transmission light (P polarization) and reflection light (S polarization) at the $(i+2)^{th}$ polarization separation film $10_{i+2}$. When the incidence angle of the light flux 100 for the polarization separation film 10 is set to be approximately 60° (as shown in FIG. 6, for example), the $i^{th}$ reflection light is output at an approximately middle position between the $(i+1)^{th}$ transmission light and the $(i+2)^{th}$ transmission light. Since the phase modulation element $20_i$ such as a ½ wavelength plate is disposed for the $i^{th}$ reflection light, the $i^{th}$ reflection light is converted into P polarization. Other reflection light (S polarization) is the same as the above reflection light. Therefore, light fluxes 100 input to the $1^{st}$ through $m^{th}$ polarization separation films 10 as non-polarization are output as the P polarization. In this, in the parallelogram block, the transmission light crosses the reflection light from the front stage; however, since the optical axes are different from each other, there is no problem.

As shown in FIGS. 3 through 6, in the case where the array of the parallelogram blocks is used, when the incidence angle of the light flux 100 for the polarization separation film 10 is set to be 30° or 60°, the reflection light is output at the position in the middle of two transmission light. However, since it is enough that the reflection light is not overlapped with the transmission light, it is not necessary that the incidence angle must be exactly 30° or 60° and the incidence angle can be approximately 30° or 60°. In addition, when the size of the input light flux 100 is thinner, the light flux in the parallelogram block can be easily controlled and also output light can be easily controlled. When the beam (the light flux 100) is thinner, the tolerance of the incidence angle and input position can be greater.

Figure 7:
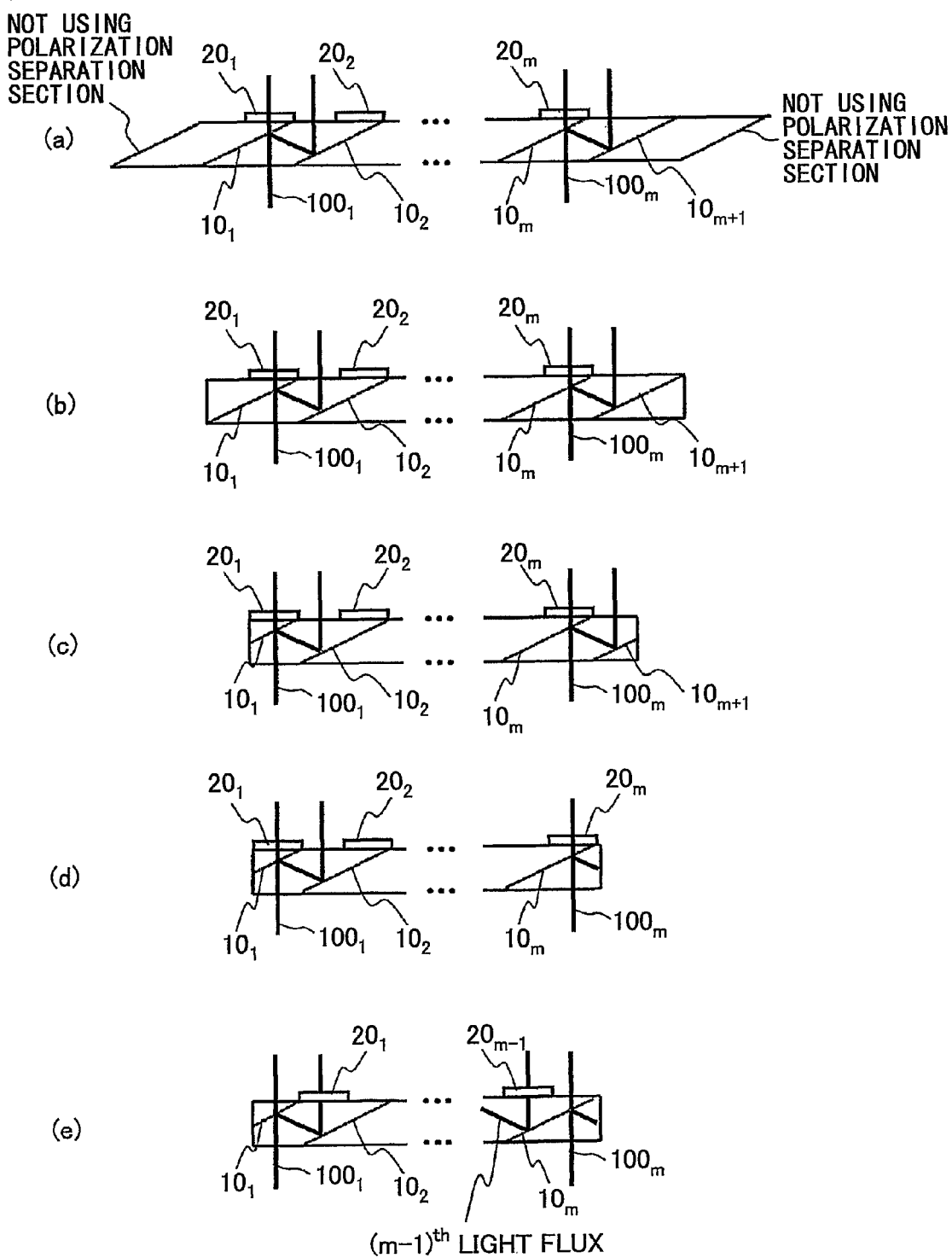
FIG. 7 is a diagram showing structures of the ends of the polarization-conversion element shown in FIGS. 3 and 4.
Figure 8:
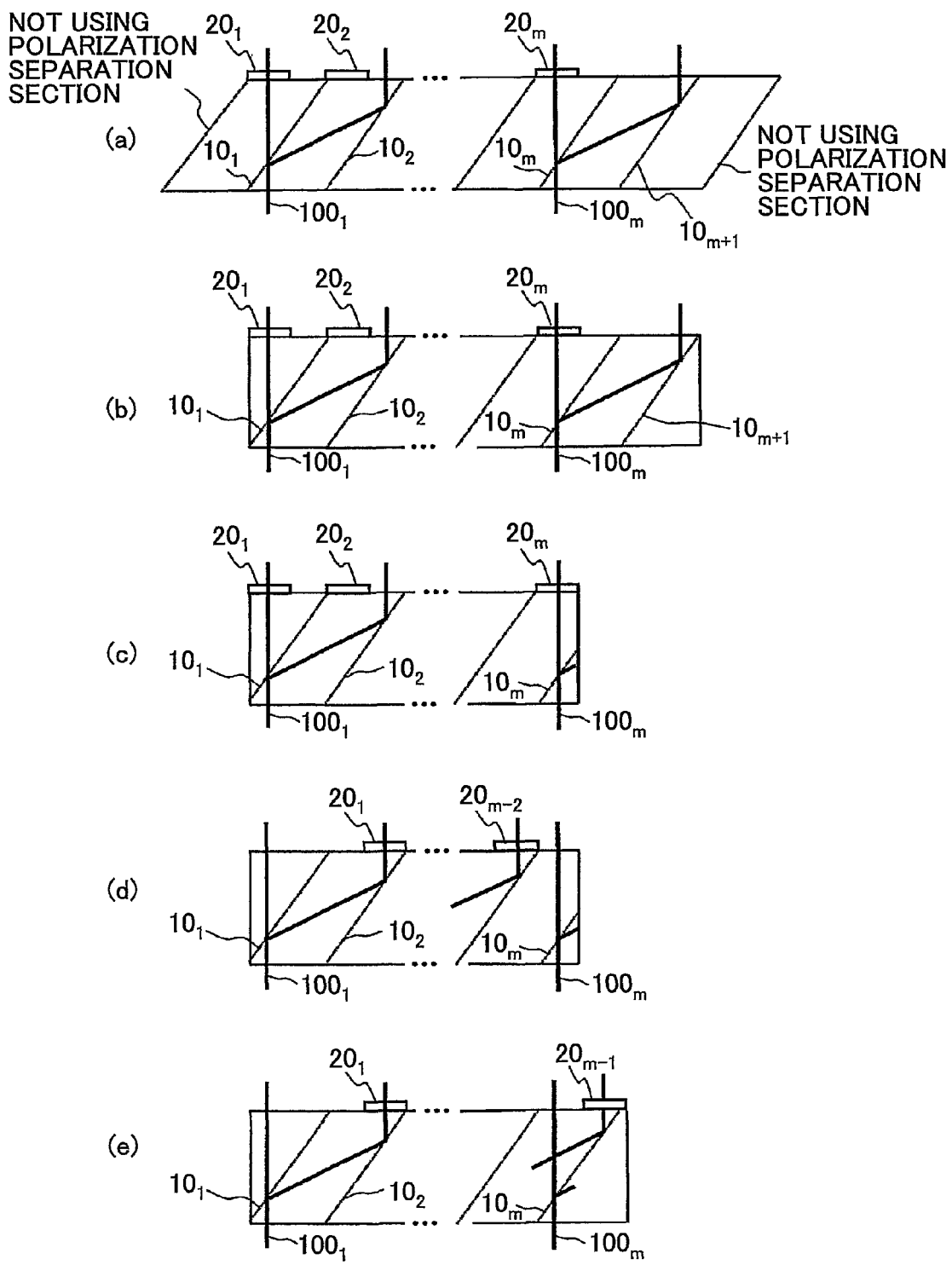
FIG. 8 is a diagram showing structures of the ends of the polarization conversion element shown in FIGS. 5 and 6.

Next, structures of ends of the polarization conversion element according to the present embodiment are described. The ends of the polarization conversion element can have various shapes. FIG. 7 is a diagram showing structures of the ends of the polarization conversion element shown in FIGS. 3 and 4. FIG. 8 is a diagram showing structures of the ends of the polarization conversion element shown in FIGS. 5 and 6.

First, the structures shown in FIG. 7 are described. In FIG. 7, the incidence angle of the light flux 100 for the polarization separation film 10 is approximately 30°. In FIG. 7(a), a parallelogram block is added at each end. In this case, the length may be long, but since the shape of the middle part is the same as that of the end, the polarization conversion element can be formed by simply obliquely cutting a long member in which the required number of parallelogram-blocks is bonded. In addition, as shown in FIGS. 7(b) and 7(c), when an unnecessary part of the ends is cut off, the total size of the polarization conversion element can be, shortened. In FIG. 7(d), the $(m+1)^{th}$ polarization separation film $10_{m+1}$ (final film) is cut off from that shown in FIG. 7(c), and the reflection light of the $m^{th}$ light flux $100_m$ cannot be used; however, the size of the polarization conversion element can be shortened. Therefore, if a desired light quantity can be obtained, the structure shown in FIG. 7(d) may be used. In this, when the phase modulation element 20 is disposed at the reflection light side, as shown in FIG. 7(e), instead of at the transmission light side shown in FIGS. 7(a) to 7(d), the number of the phase modulation sections 20 is (m−1).

Next, the structures shown in FIG. 8 are described. In FIG. 8, the incidence angle of the light flux 100 for the polarization separation film 10 is approximately 60°. In FIG. 8(a), similar to FIG. 7(a), a parallelogram block is added at each end. In FIG. 8(b), similar to that shown in FIG. 7(c), an unnecessary part of the ends is cut off, and in FIG. 8(c), similar to that shown in FIG. 7(d), the $(m+1)^{th}$ polarization separation film $10_{m+1}$ (final film) is cut off from that shown in FIG. 8(b), and the reflection light of the $m^{th}$ light flux $100_m$ is not used. In FIG. 8(d), the phase modulation element 20 is disposed at the reflection light side instead of at the transmission light side shown in FIG. 8(c). In FIG. 8(e), the $m^{th}$ polarization separation film $10_m$ is extended from that shown in FIG. 8(d) and the $(m-1)^{th}$ phase modulation element $20_{m-1}$ is added. The optical effect of that shown in FIG. 8 is almost the same as that shown in FIG. 7; however, the size can be shorter than that shown in FIG. 7. In the case of FIG. 8(d), since the $m^{th}$ and $(m-1)^{th}$ reflection light cannot be used, the number of the phase modulation elements 20 is (m−2). In the case of FIG. 8(e), the $(m-1)^{th}$ reflection light is used.

Next, a second embodiment of the present invention is described. In the second embodiment of the present invention, polarization conversion elements using plate-shaped polarization separation elements instead of using the parallelogram blocks are described. The polarization conversion element using the plate-shaped polarization separation elements can obtain the same effect as that in the polarization conversion element using the parallelogram blocks.

Figure 9:
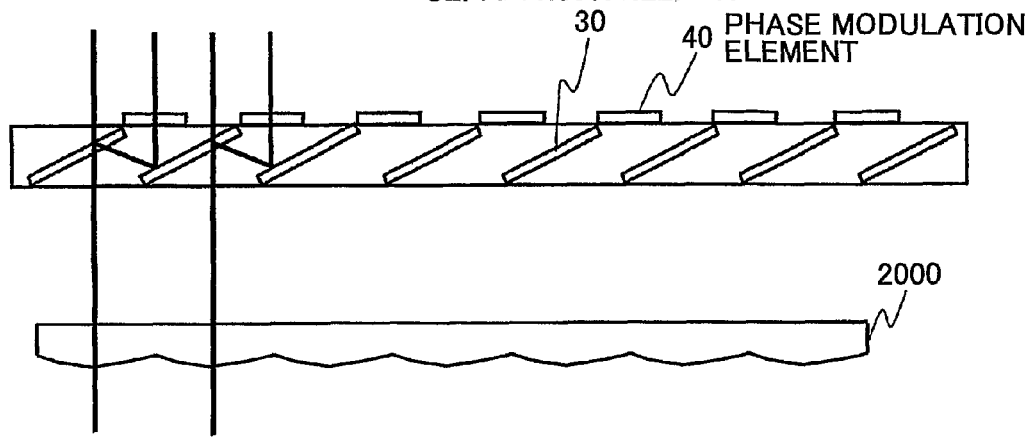
FIG. 9 is a diagram showing a first structure of a polarization conversion element using plate-shaped polarization separation elements according to a second embodiment of the present invention.
Figure 10:
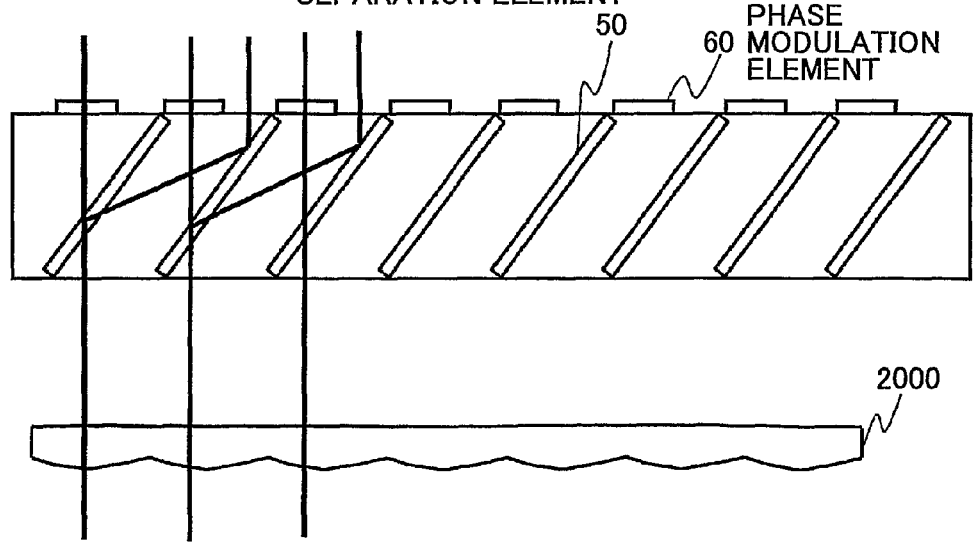
FIG. 10 is a diagram showing a second structure of the polarization conversion element using plate-shaped polarization separation elements according to the second embodiment of the present invention.

FIG. 9 is a diagram showing a first structure of a polarization conversion element using plate-shaped polarization separation elements according to the second embodiment of the present invention. FIG. 10 is a diagram showing a second structure of the polarization conversion element using plate-shaped polarization separation elements according to the second embodiment of the present invention.

In FIG. 9, corresponding to that, shown in FIG. 4, instead of the parallelogram blocks, plural plate-shaped polarization separation elements 30 are arrayed in a polarization conversion element. The plate-shaped polarization separation elements 30 are arrayed with the same pitch as that of the light flux from a lens in the fly-eye lens 2000 so that the polarization separation surface of the plate-shaped polarization separation element 30 is approximately 60° relative to the optical axis of the input light flux (incidence angle for the plate-shaped polarization separation element 30 is approximately 30°). The light input surface to a frame supporting the polarization conversion element and the light output surface from the frame supporting the polarization conversion element are orthogonal to the optical axis of the light flux, and similar to that shown in FIG. 4, a phase modulation element 40 such as a ½ wavelength plate is disposed at the approximately left-half region of the light output surface of the frame supporting the plate-shaped polarization separation elements 30.

In FIG. 10, corresponding to that shown in FIG. 5, instead of the parallelogram blocks, plural plate-shaped polarization separation elements 50 are arrayed in a polarization conversion element. The plate-shaped polarization separation elements 50 are arrayed with the same pitch as that of the light flux from a lens in the fly-eye lens 2000 so that the polarization separation surface of the plate-shaped polarization separation element 50 is approximately 30° relative to the optical axis of the input light flux (incidence angle for the plate-shaped polarization separation element 50 is approximately 60°). The light input surface to a frame supporting the polarization conversion element and the light output surface from the frame supporting the polarization conversion element are orthogonal to the optical axis of the light flux, and similar to that shown in FIG. 5, a phase modulation element 60 such as a ½ wavelength plate is disposed at the approximately left-half region of the light output surface of the frame supporting the plate-shaped polarization separation elements 50.

In case of the polarization conversion element using the plate-shaped polarization separation elements 30 (50) shown in FIGS. 9 and 10, the plate-shaped polarization separation elements 30 (50) and the phase modulation elements 40 (60) are supported by a suitable frame, as described above. The plate-shaped polarization separation element 30 (50) can be formed, for example, by a single face multilayer film, a multilayer film whose both sides are sandwiched by a transparent material, or a wire grid filter; therefore, the degree of freedom in designing can be large. In addition, a polishing process is not requited; thus the cost can be reduced.

Figure 11:
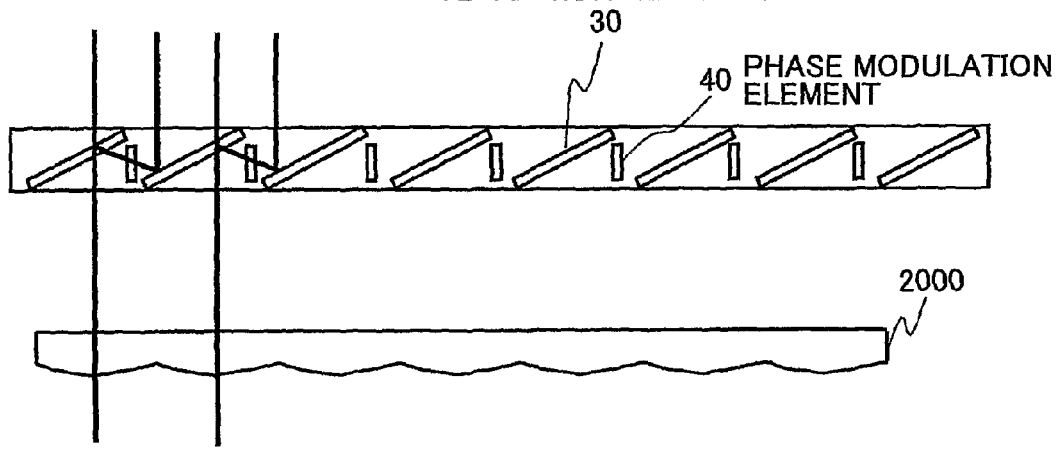
FIG. 11 is a modified example of the polarization conversion element shown in FIG. 9.
Figure 12:
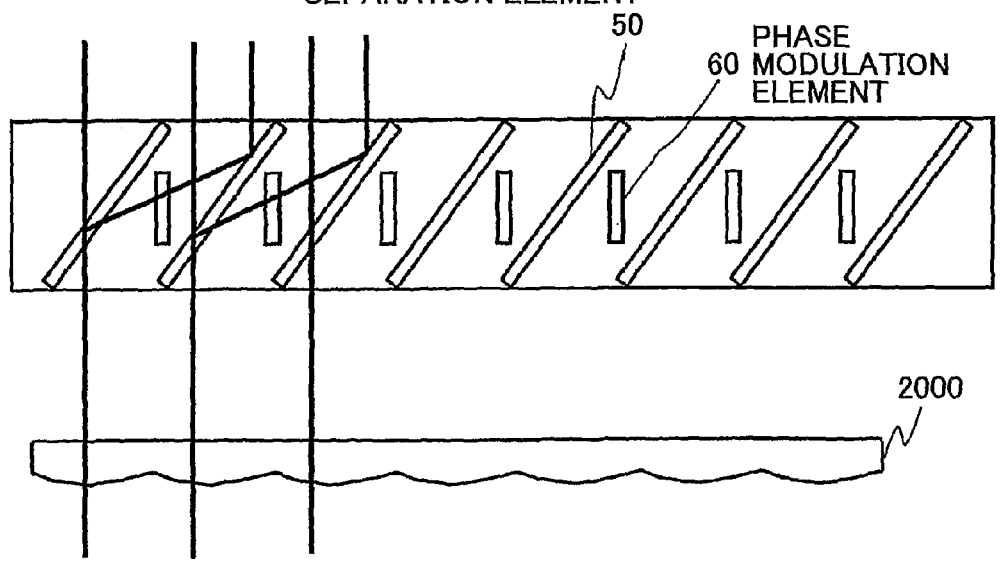
FIG. 12 is a modified example of the polarization conversion element shown in FIG. 10.

FIG. 11 is a modified example of the polarization conversion element shown in FIG. 9. FIG. 12 is a modified example of the polarization conversion element shown in FIG. 10. As shown in FIGS. 11 and 12, in case of the plate-shaped polarization separation element 30 (50), the phase modulation element 40 (60) can be disposed at a position other than the light output surface of the frame supporting the polarization conversion element. In FIG. 11, the phase modulation element 40 is disposed between the plate-shaped polarization separation elements 30. The reflection light (S polarization) at the plate-shaped polarization separation element 30 is converted into P polarization at the phase modulation element 40, and the P polarization is reflected at the next plate-shaped polarization separation element 30. The operations in FIG. 12 are the same as those in FIG. 11.

When the plate-shaped polarization separation element 30 (50) is used, there is a risk that the transmission light and the reflection light are output with the same pitch in the direction that the incidence angle becomes large when the thickness of the plate-shaped polarization separation element 30 (50) becomes larger so that the optimal angle of the polarization separation surface is suffered from the plate thickness. When the incidence angle is 30°, the influence on the optimal incidence angle caused by the plate thickness is small, but when the incidence angle is 60°, the influence on the optimal incidence angle caused by the plate thickness may be large. However, similar to the case of the parallelogram blocks, it is enough when the transmission light and the reflection light are not overlapped. Therefore, it is not necessary that the transmission light and the reflection light are output with the same pitch. The tolerance of the angle becomes wide when the light flux is thin.

Figure 13:
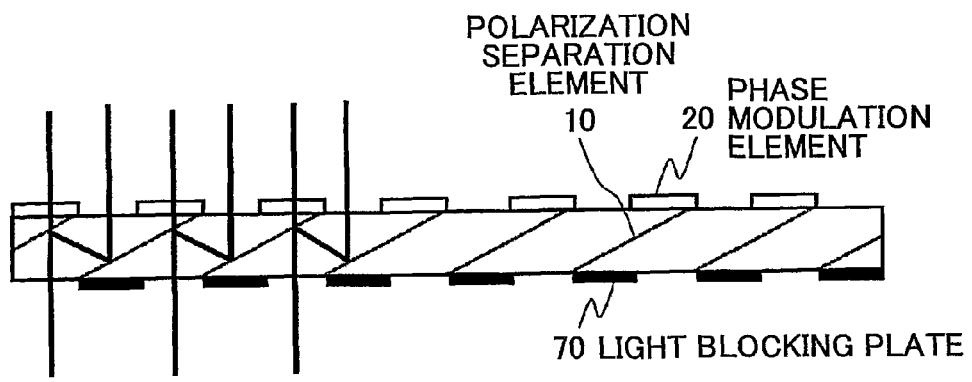
FIG. 13 is a diagram showing a polarization conversion element on whose light input surface light blocking plates (films) are formed according to the first embodiment of the present invention.
Figure 14:
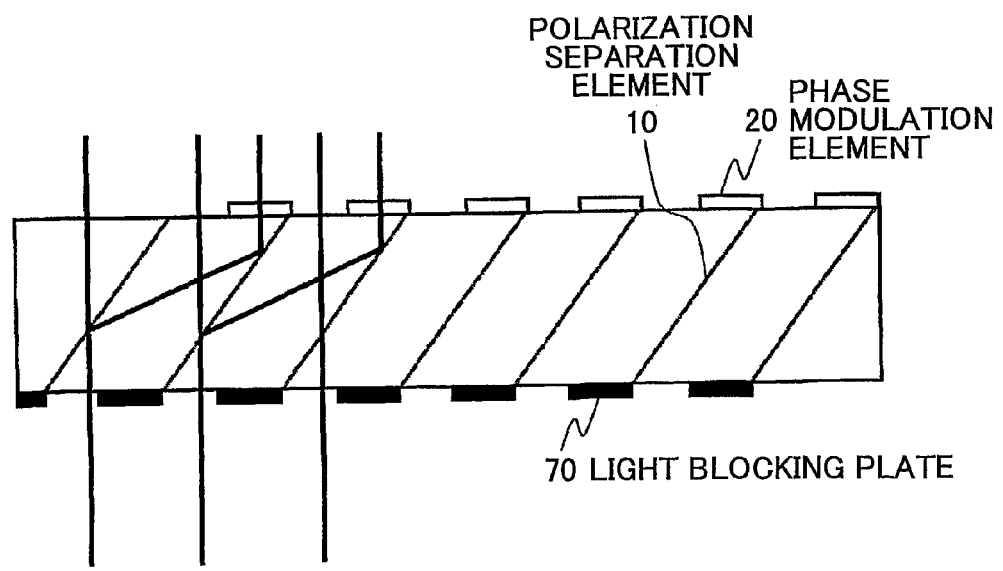
FIG. 14 is a diagram showing another polarization conversion element on whose light input surface light blocking plates (films) are formed according to the first embodiment of the present invention.

FIG. 13 is a diagram showing a polarization conversion element on whose light input surface light blocking plates (films) are formed according to the first embodiment of the present invention. FIG. 14 is a diagram showing another polarization conversion element on whose light input surface light blocking plates (films) are formed according to the first embodiment of the present invention. In FIGS. 13 and 14, light blocking plates 70 are formed on the light input surface of the parallelogram blocks. The light blocking plates 70 can also be formed on the light input surface of the polarization conversion element having the plate-shaped polarization separation elements. When the light blocking plates 70 are formed on the light input side surface of the polarization conversion element, the polarization conversion efficiency can be made high by blocking unnecessary light and flare light. In this case, the polarization conversion may be performed by transmitting half of the total light fluxes.

Figure 15:
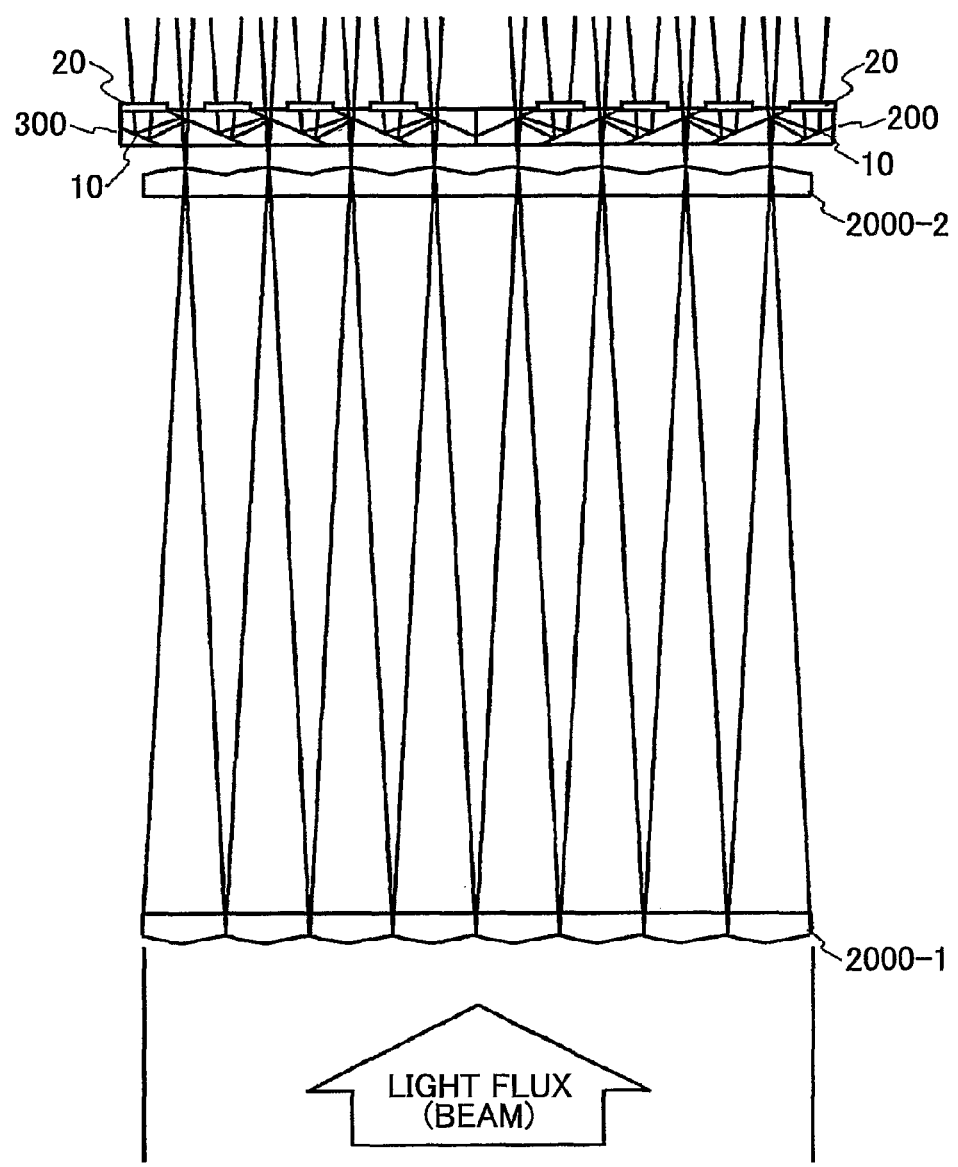
FIG. 15 is a diagram showing a first example of an optical system in which polarization conversion elements are disposed in central symmetry according to a third embodiment of the present invention.
Figure 16:
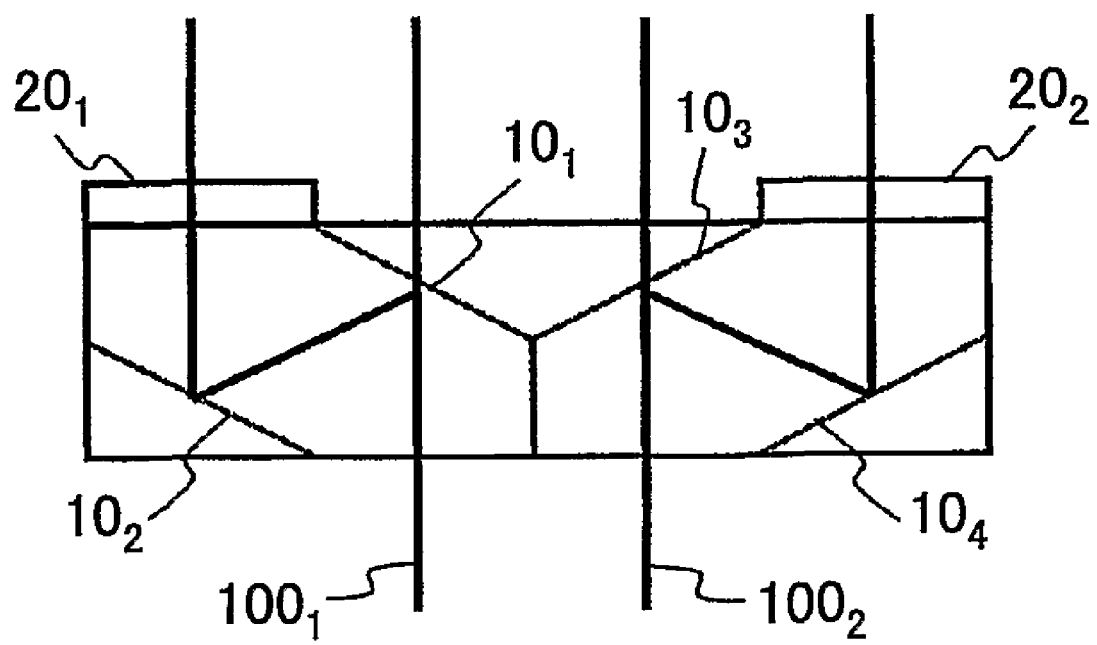
FIG. 16 is a diagram showing a second example of an optical system in which polarization conversion elements are disposed in central symmetry according to the third embodiment of the present invention.
Figure 17:
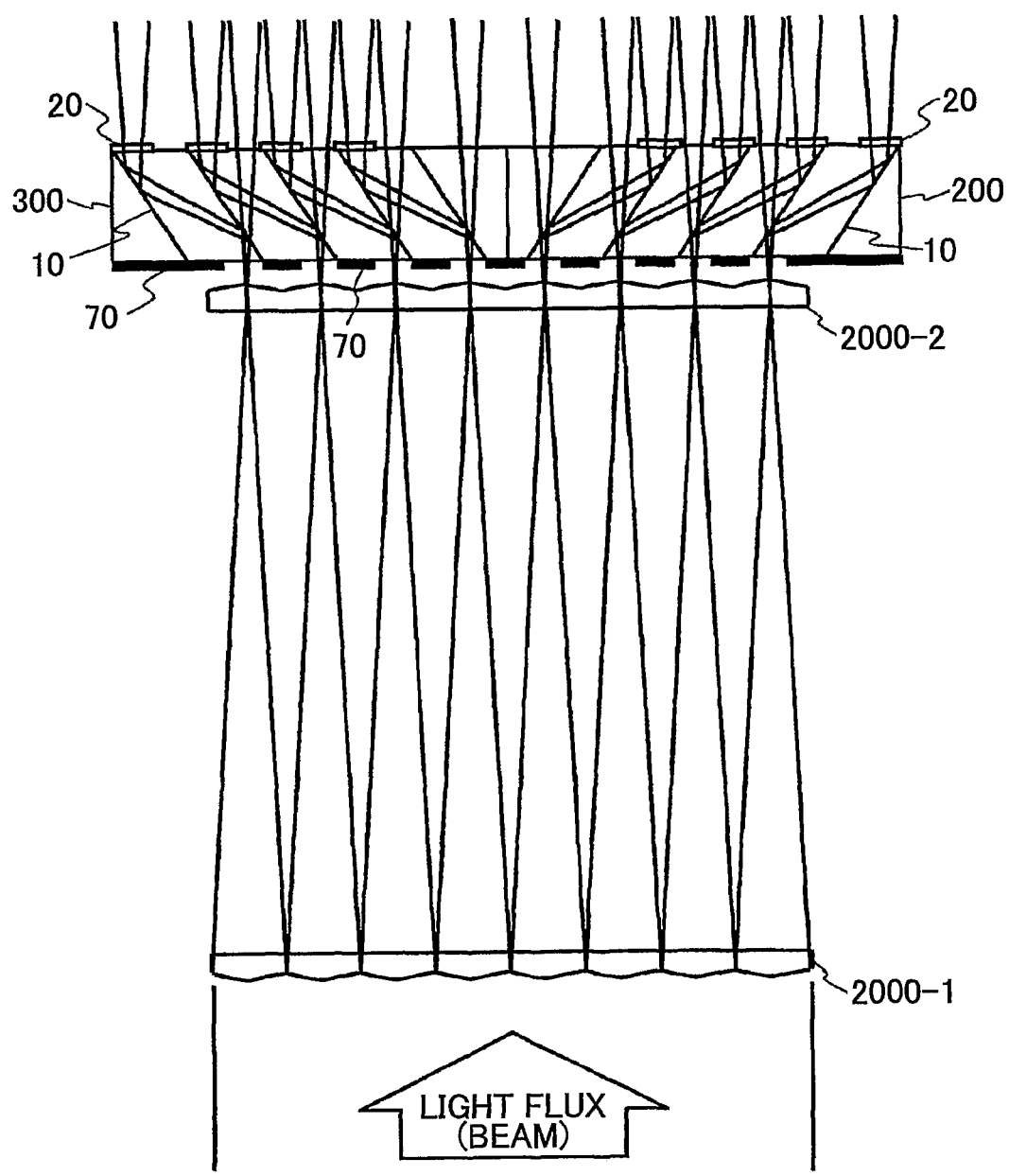
FIG. 17 is a diagram showing a third example of an optical system in which polarization conversion elements are disposed in central symmetry according to the third embodiment of the present invention.
Figure 18:
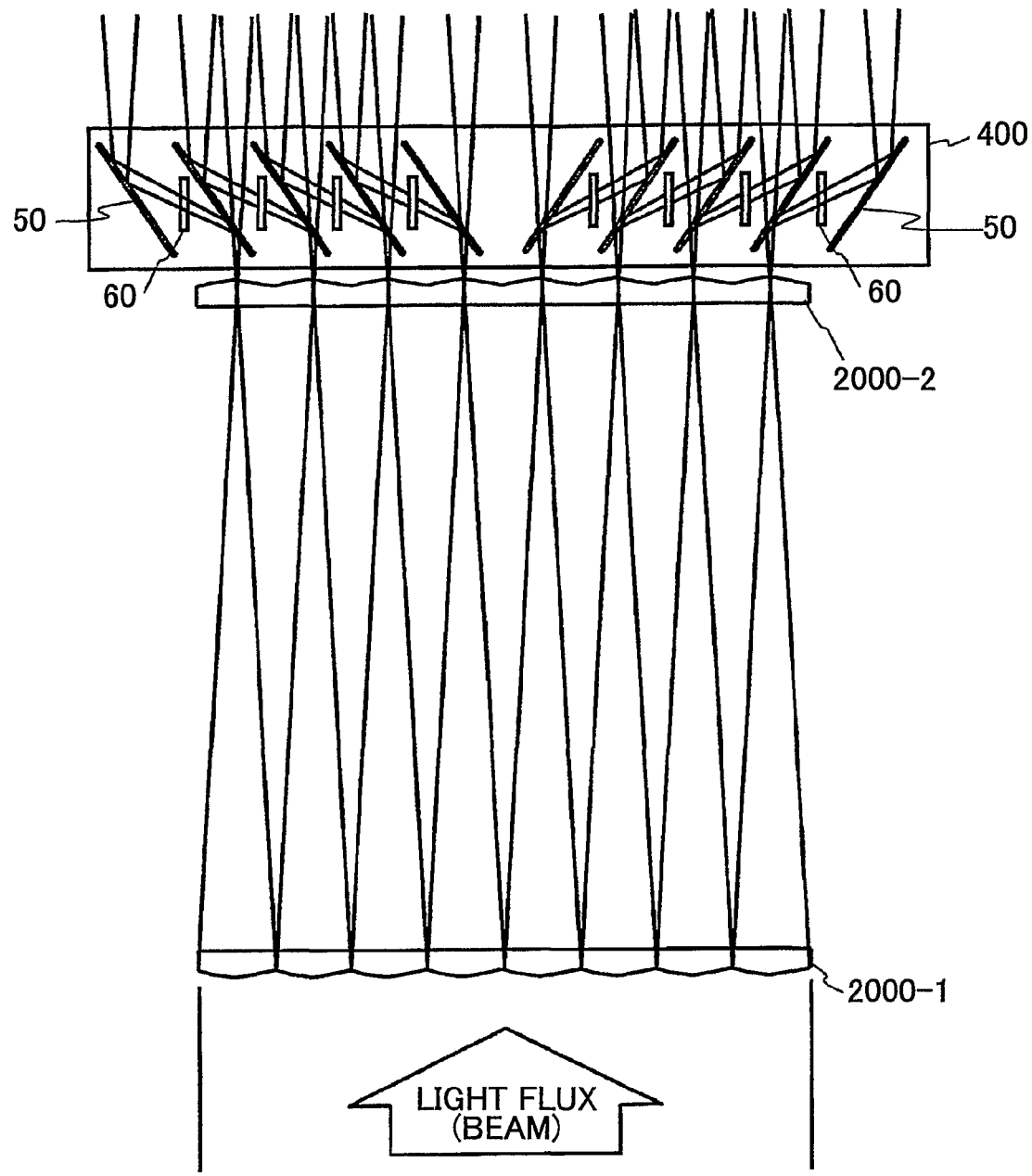
FIG. 18 is a diagram showing a fourth example of an optical system in which a polarization conversion element having a central symmetry structure is disposed according to the third embodiment of the present invention.

FIG. 15 is a diagram showing a first example of an optical system in which polarization conversion elements are disposed in central symmetry according to a third embodiment of the present invention. FIG. 16 is a diagram showing a second example of an optical system in which polarization conversion elements are disposed in central symmetry according to the third embodiment of the present invention. FIG. 17 is a diagram showing a third example of an optical system in which polarization conversion elements are disposed in central symmetry according to the third embodiment of the present invention. FIG. 18 is a diagram showing a fourth example of an optical system in which a polarization conversion element having a central symmetry structure is disposed according to the third embodiment of the present invention.

The operations of the polarization conversion are the same as those described above; however, when the polarization conversion elements are disposed in central symmetry in the optical system, the optical paths can be formed in central symmetry. Therefore, the total structure of the optical system can be easily established. Since the polarization conversion elements are disposed in central symmetry, generally, the number of the polarization separation elements is "m+2" and the number of the phase modulation elements is "m" for the number of the light fluxes (light beams) "m". As shown in FIG. 16, the minimum unit is a case of "m=2", that is, the number of the polarization separation elements 10 is four ($10_1$ through $10_4$), and the number of the phase modulation elements 20 is two ($20_1$ and $20_2$).

Figure 27:
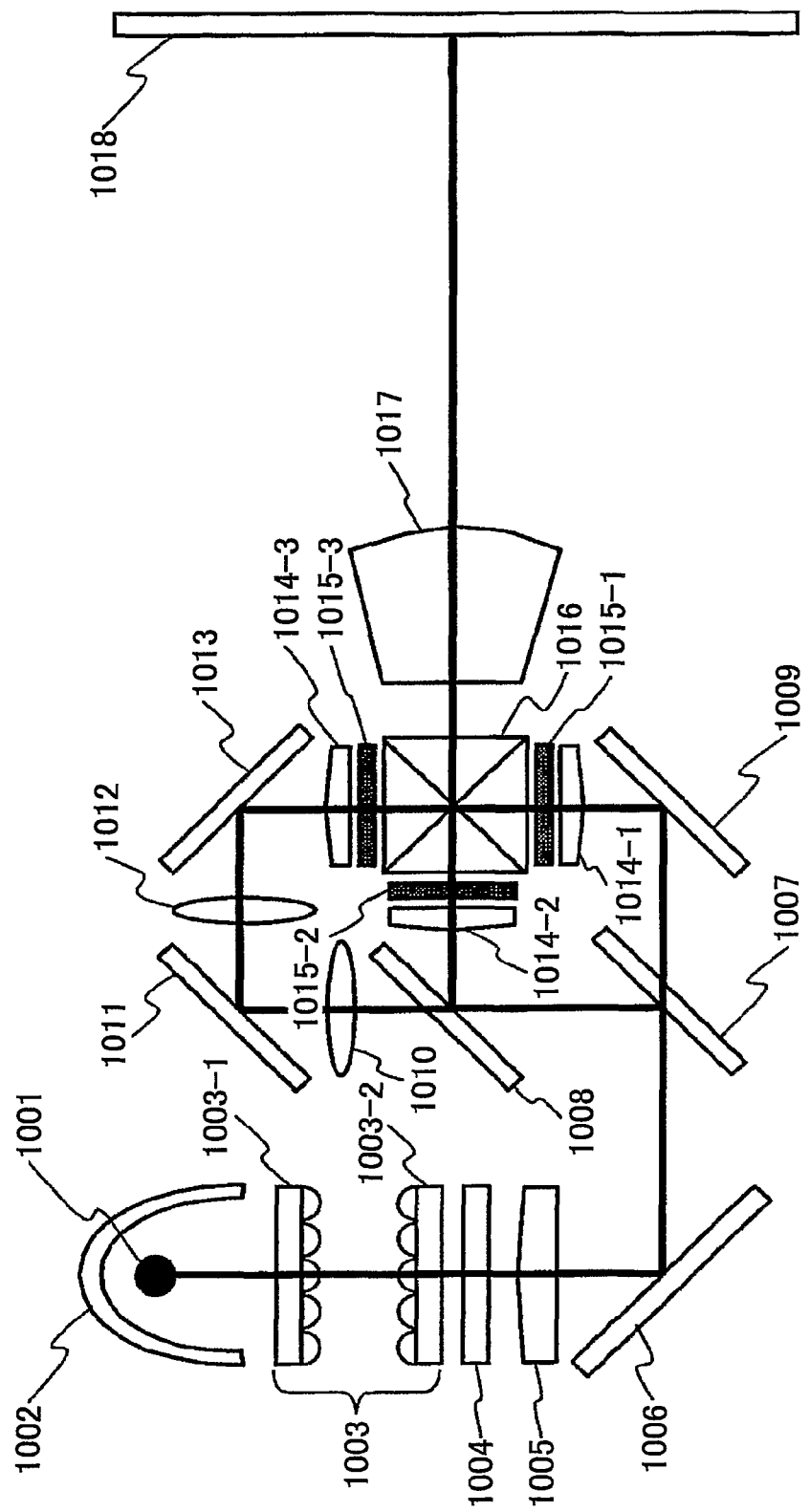
FIG. 27 is a diagram showing a transmission type liquid crystal image projecting apparatus.
Figure 28:
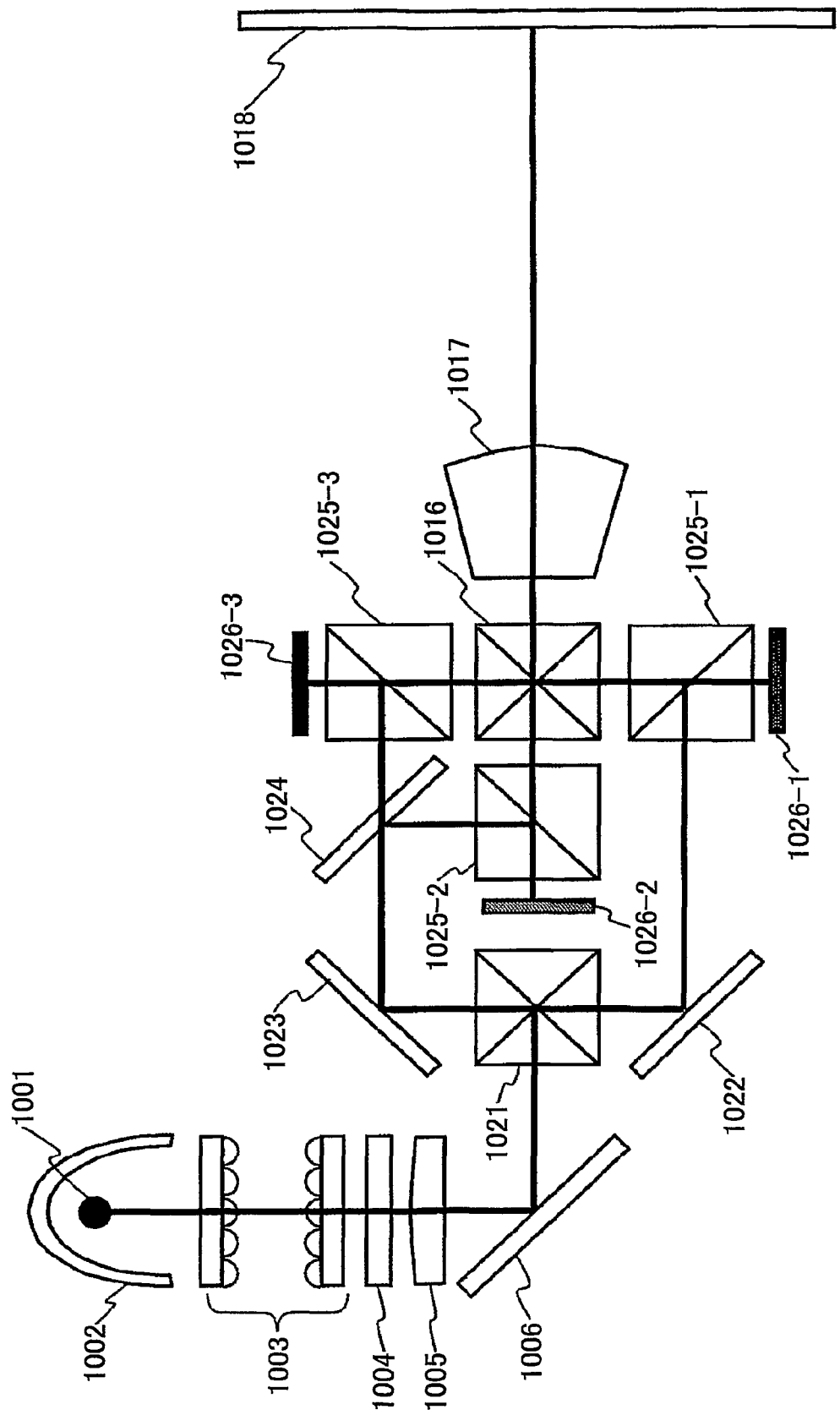
FIG. 28 is a diagram showing a reflection type liquid crystal image projecting apparatus.

In FIGS. 15, 17, and 18, examples are shown in which polarization conversion elements are combined with an optical integrator composed of a first fly-eye lens 2000-1 and a second fly-eye lens 2000-2 that are used in an image projecting apparatus such as a projector. The optical integrator shown in FIGS. 15, 17, and 18 corresponds to the optical integrator 1003 shown in FIGS. 27 and 28.

In FIG. 15, two polarization conversion elements 200 and 300 are symmetrically disposed relative to the center of the second fly-eye lens 2000-2. In FIG. 17, the light blocking plates 70 are additionally formed on the light input surfaces of the polarization conversion elements 200 and 300. In FIG. 18, a polarization conversion element 400 is formed by symmetrically disposing the plate-shaped polarization separation elements 50 relative to the center of the second fly-eye lens 2000-2, and the phase modulation element 60 is disposed between the two plate-shaped polarization separation elements 50. In FIGS. 15, 17, and 18, the light fluxes are not parallel light; however, the light fluxes are focused on the second fly-eye lens 2000-2. Therefore, light beams inputting to the polarization conversion elements 200 and 300, or 400, are thin and the polarization conversion is performed without losing light quantity. In FIG. 17, the light blocking plates 70 may be unnecessary because the light fluxes focused on the second fly-eye lens 2000-2 are input to the polarization conversion elements 200 and 300; however, when the polarization conversion elements 200 and 300 are used in an image projecting apparatus such as a projector, light may actually go into unnecessary parts of the image projecting apparatus. The light blocking plates 70 are effective to block light from entering such unnecessary parts.

Figure 19:
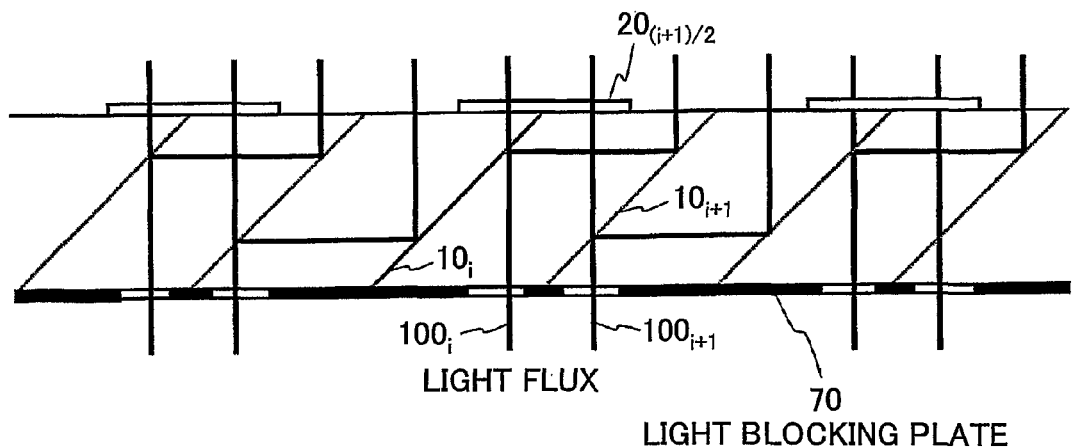
FIG. 19 is a diagram showing a principle structure of a polarization conversion element according to another embodiment of the present invention.

FIG. 19 is a diagram showing a structure of a polarization conversion element according to another embodiment of the present invention. In FIG. 19, the polarization separation element (film) 10 is disposed at 45° relative to the optical axis of the light flux 100 by making the pitch of the light flux 100 different from the pitch of the polarization separation element 10. That is, the reflection light (S polarization) from the polarization separation element $10_i$ is reflected by the next polarization separation element $10_{i+1}$ at a position different from the input light position to the polarization separation element $10_{i+1}$ in the same direction as that of the transmission light (P polarization) at the polarization separation element $10_i$. The transmission light (P polarization) at the polarization separation films $10_i$ and $10_{i+1}$ is modulated into S polarization at one phase modulation element $20_{(i+1)/2}$ such as a ½ wavelength plate and the S polarization is output. In an alternative embodiment, if the phase modulation element 20 is disposed on the light output surface of the reflection light (S polarization), the output light of the transmission light and the reflection light can be the P polarization. In addition, if plate-shaped polarization separation elements 30 are used, the plate-shaped polarization separation element 30 can be disposed at 45° relative to the optical axis of the light flux 100 by making the pitch of the light flux 100 different from the pitch of the plate-shaped polarization separation element 30. In the above structure, the number of the phase modulation elements 20 can be approximately half the number of the light fluxes 100.

Figure 20:
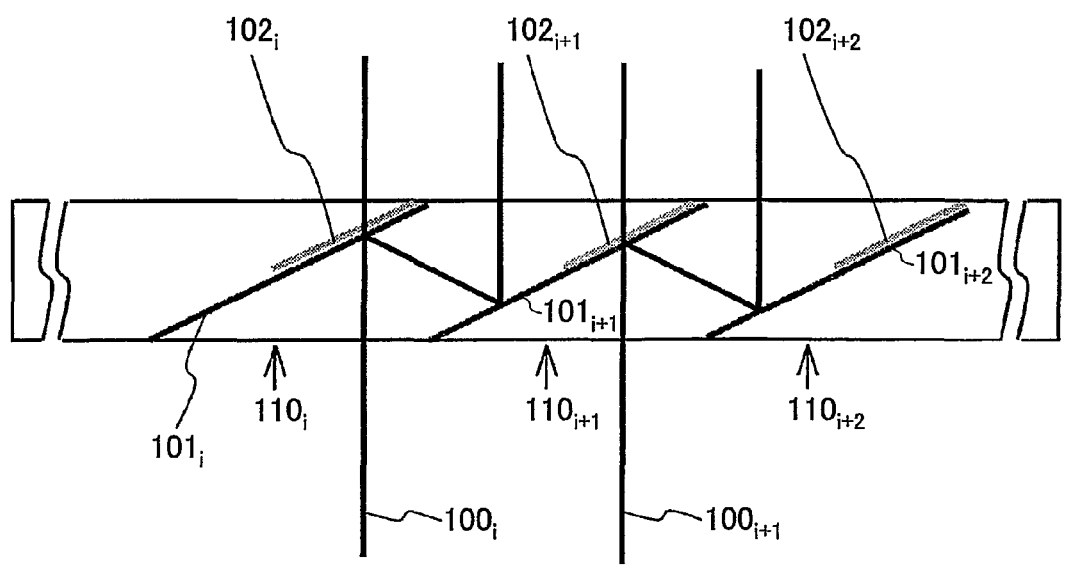
FIG. 20 is a diagram showing a first polarization conversion element according to a fourth embodiment of the present invention.
Figure 21:
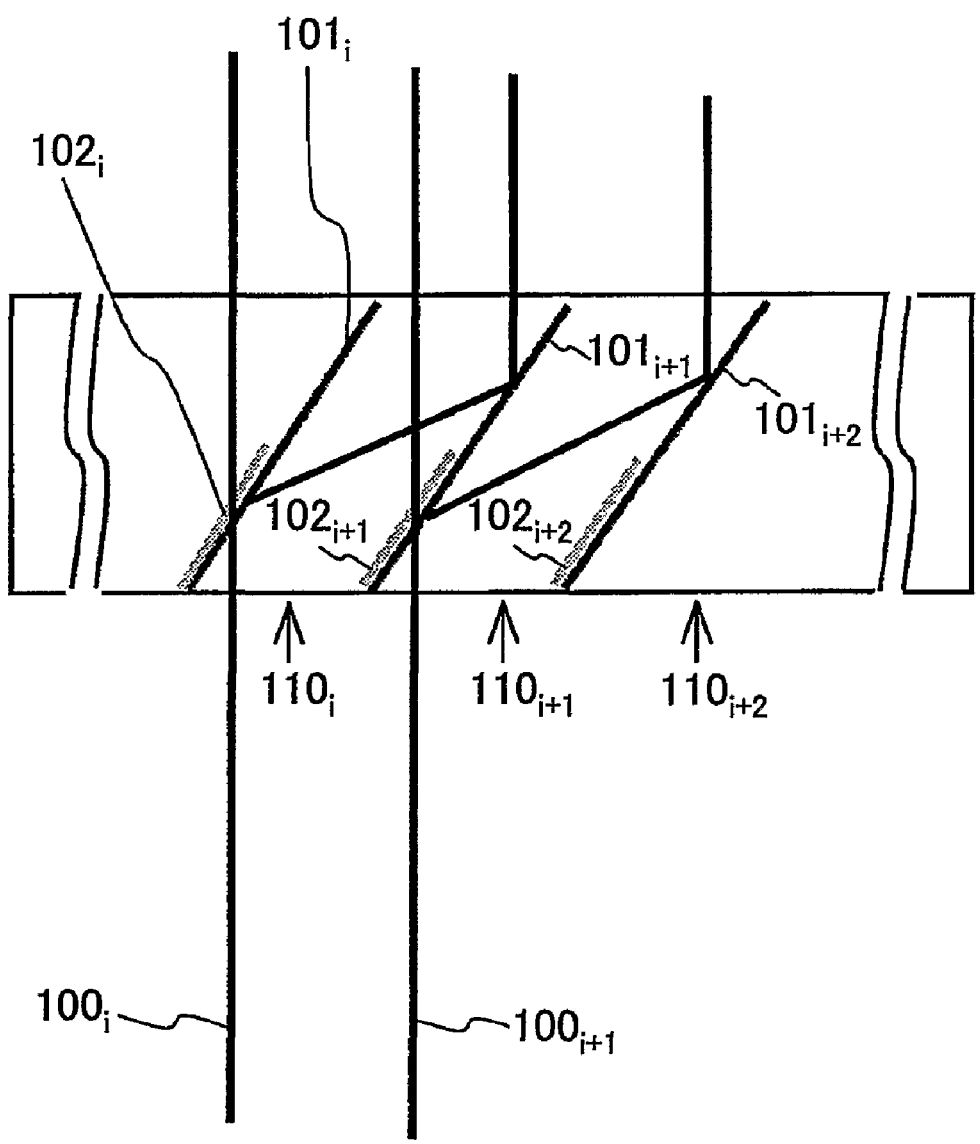
FIG. 21 is a diagram showing a second polarization conversion element according to the fourth embodiment of the present invention.
Figure 22:
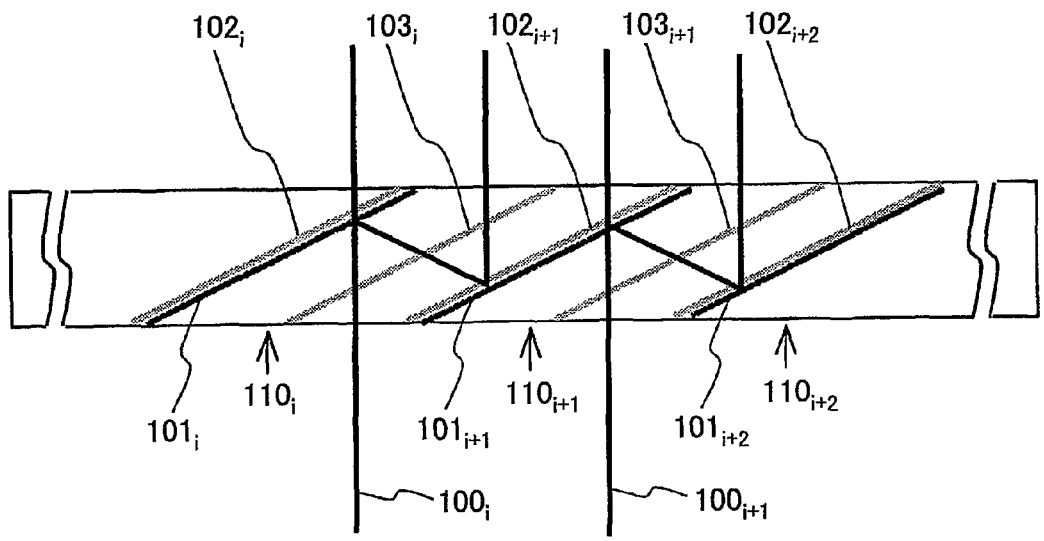
FIG. 22 is a diagram showing a third polarization conversion element according to the fourth embodiment of the present invention.
Figure 23:
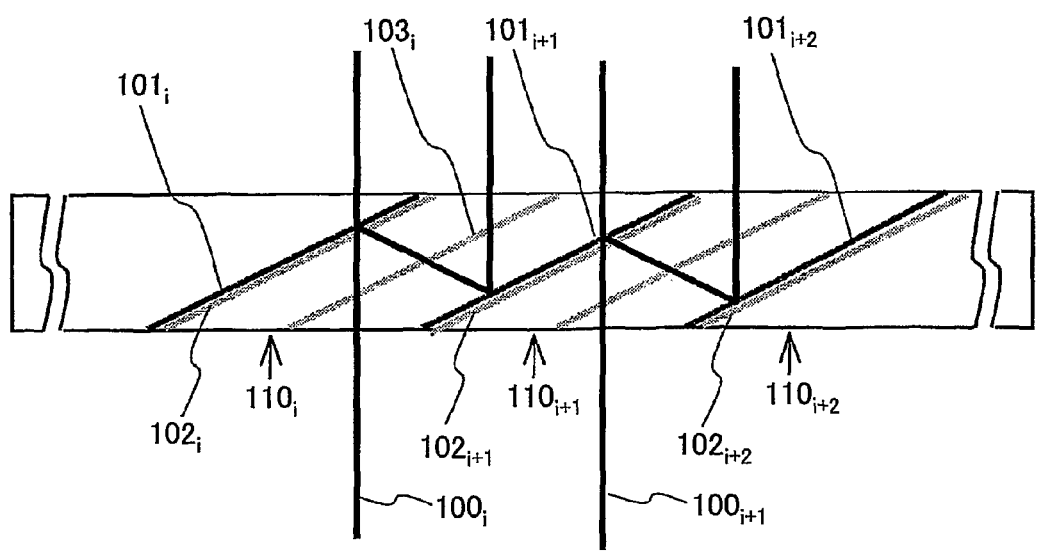
FIG. 23 is a diagram showing a fourth polarization conversion element according to the fourth embodiment of the present invention.

Next, a fourth embodiment of the present invention is described. FIG. 20 is a diagram showing a first polarization conversion element according to the fourth embodiment of the present invention. FIG. 21 is a diagram showing a second polarization conversion element according to the fourth embodiment of the present invention. FIG. 22 is a diagram showing a third polarization conversion element according to the fourth embodiment of the present invention. FIG. 23 is a diagram showing a fourth polarization conversion element according to the fourth embodiment of the present invention.

In the fourth embodiment, a phase modulation element is disposed near and parallel to a polarization separation element so that the phase modulation element faces the polarization separation element. Especially, when the polarization separation element is disposed parallel to the phase modulation element, a structure in which the polarization separation element is stacked parallel to the phase modulation element can be used, and a structure in which the phase modulation element is closely disposed on the polarization separation element is also possible. Therefore, both the elements can be disposed at high accuracy. In addition, the polarization conversion element can be easily manufactured. This is described below in detail.

As the phase modulation element, similar to the first through third embodiments, a ½ wavelength plate is suitable. In addition, as the phase modulation element, an element having a ½ wavelength plate function such as a film type ½ wavelength element having a phase difference, a ½ wavelength element made of mica, and an element having a ½ wavelength function by a structural birefringence can be used.

As the polarization separation element, an element having polarization separation characteristics for the light fluxes such as a polarization beam splitter formed by a dielectric multilayer, and a wire grid type polarization beam splitter made of a metal grid can be used. The polarization conversion element can be easily manufactured by arraying only the same number of the polarization conversion sections (polarization elements) as that of the input light fluxes. In addition, since the phase modulation elements are disposed in the polarization conversion element, the characteristics of the polarization conversion element can be stable. Further, since the ½ wavelength plate can be closely disposed on the polarization separation element by using a glass substrate on which the polarization separation element is formed, the thermal conductivity can be high and the heat resistance can be increased. The glass substrate is described below.

In FIG. 20, similar to that shown in FIG. 3, plural parallelogram blocks 110 (in some cases, hereinafter referred to as polarization elements), in which the light input surface and the light output surface of the parallelogram block 110 are orthogonal to the optical axis of the input light flux 100 and the bonding surface of the parallelogram block 110 are approximately 60° relative to the optical axis of the input light flux 100 (incidence angle is approximately 30°), are arrayed. Further, a polarization separation element 101 made of, for example, a polarization separation film is disposed on the bonding surface and a phase modulation element 102 is closely disposed on the approximately right-half region on the polarization separation element 101.

Next, operations of the polarization conversion element shown in FIG. 20 are described. The light fluxes 100 are input to the corresponding polarization elements 110 (parallelogram blocks). The light flux $100_i$ input to the $i^{th}$ polarization element $110_i$ is separated into S polarization being reflected by the polarization separation element $101_i$ and P polarization being transmitted through the polarization separation element $101_i$. The P polarization is converted into S polarization by being transmitted through the phase modulation element $102_i$. The S polarization reflected by the polarization separation element $101_i$ is input to a part of the $(i+1)^{th}$ polarization separation element $101_{i+1}$ of the $(i+1)^{th}$ polarization element $110_{i+1}$ where the phase modulation element $102_{i+1}$ does not exist and is reflected again by the $(i+1)^{th}$ polarization separation element $101_{i+1}$. Since the plural polarization elements 110 are disposed almost in parallel, the transmission light of the polarization element $110_i$ and the reflection light of the polarization element $110_{i+1}$ are output in almost the same direction.

Similarly, the light flux $100_{i+1}$ input to the $(i+1)^{th}$ polarization element $110_{i+1}$ is separated into S polarization and P polarization by the polarization separation element $101_{i+1}$ of the polarization element $110_{i+1}$. The P polarization (transmission light) is converted into S polarization by being transmitted through the phase modulation element $102_{i+1}$. The S polarization reflected by the polarization separation element $101_{i+1}$ is input to a part of the $(i+2)^{th}$ polarization separation element $101_{i+2}$ of the $(i+2)^{th}$ polarization element $110_{i+2}$ where the phase modulation element $102_{i+2}$ does not exist and is reflected again by the $(i+2)^{th}$ polarization separation element $101_{i+2}$ in the same direction of the transmission light.

As described above, in FIG. 20, similar to that shown in FIG. 3, the light fluxes 100, which are input randomly or as non-polarization to the polarization elements 110, are output as the S polarization. In addition, since the phase modulation element 102 is closely disposed on the polarization separation element 101, the phase modulation element 102 can be disposed at high accuracy and the structure of the polarization conversion element is simple.

Still referring to FIG. 20, if the phase modulation element 102 is disposed on the approximately left-half region on the polarization separation element 101, similar to that shown in FIG. 4, the light fluxes 100, which are input randomly or as non-polarization to the polarization elements 110, are output as the P polarization.

In FIG. 21, similar to that shown in FIG. 5, plural parallelogram blocks 110 (in some cases, hereinafter referred to as polarization elements), in which the light input surface and the light output surface of the parallelogram block 110 are orthogonal to the optical axis of the input light flux 100 and the bonding surface of the parallelogram block 110 is approximately 30° relative to the optical axis of the input light flux 100 (incidence angle is approximately 60°), are arrayed. Further, a polarization separation element 101 is disposed on the bonding surface and a phase modulation element 102 is closely disposed on the approximately left-half region of the polarization separation element 101.

Operations of the polarization conversion element shown in FIG. 21 are basically the same as those shown in FIG. 20. The light fluxes 100 are input to the corresponding polarization elements 110. The light flux $100_i$ input to the $i^{th}$ polarization element $110_i$ is separated into S polarization being reflected by the polarization separation element $101_i$ and P polarization being transmitted through the polarization separation element $101_i$. The P polarization is converted into S polarization by being transmitted through the phase modulation element $102_i$. The S polarization reflected by the polarization separation element $101_i$ is input to a part of the $(i+1)^{th}$ polarization separation element $101_{i+1}$ of the $(i+1)^{th}$ polarization element $110_{i+1}$ where the phase modulation element $102_{i+1}$ does not exist and is reflected again by the $(i+1)^{th}$ polarization separation element $101_{i+1}$ and is output in the same direction as that of the transmission light.

The light flux $100_{i+1}$ input to the $(i+1)^{th}$ polarization element $110_{i+1}$ is separated into S polarization and P polarization by the polarization separation element $101_{i+1}$ of the polarization element $110_{i+1}$. The P polarization is converted into S polarization by being transmitted through the phase modulation element $102_{i+1}$ and the converted-S polarization is output at a position in between the transmission light and the reflection light of the light flux $100_i$. The S polarization reflected by the polarization separation element $101_{i+1}$ is input to a part of the $(i+2)^{th}$ polarization separation element $101_{i+2}$ of the (i+2)$^{th}$ polarization element $110_{i+2}$ where the phase modulation element $102_{i+2}$ does not exist and is reflected again by the (i+2)$^{th}$ polarization separation element $101_{i+2}$ in the same direction of the transmission light of the polarization separation element $101_{i+1}$.

As described above, in FIG. 21, similar to that shown in FIG. 5, the light fluxes 100, which are input randomly or as non-polarization to the polarization elements 110, are output as the S polarization. In addition, since the phase modulation element 102 is closely disposed on the polarization separation element 101, the phase modulation element 102 can be disposed at high accuracy and the structure of the polarization conversion element is simple.

Still referring to 21, if the phase modulation element 102 is disposed on the approximately right-half region of the polarization separation element 101, similar to that shown in FIG. 6, the light fluxes 100 input to the polarization elements 110 are output as the P polarization.

In FIG. 22, in the polarization conversion element, similar to that shown in FIG. 20, plural parallelogram blocks 110 (in some cases, hereinafter referred to as polarization elements), in which the bonding surface of the parallelogram block 110 is approximately 60° relative to the optical axis of the input light flux 100 (incidence angle is approximately 30°), are arrayed. However, the phase modulation element 102 is disposed on the approximately total region of the polarization separation element 101. In addition, a second phase modulation element 103 is disposed parallel to the polarization separation element 101 and the phase modulation element 102.

Next, operations of the polarization conversion element shown in FIG. 22 are described. The light fluxes 100 are input to the corresponding polarization elements 110. The light flux $100_i$ input to the i$^{th}$ polarization element $110_i$ is transmitted through the second phase modulation element $103_i$ and is separated into S polarization being reflected by the polarization separation element $101_i$ and P polarization being transmitted through the polarization separation element $101_i$. The P polarization is converted into S polarization by being transmitted through the phase modulation element $102_i$. The S polarization reflected by the polarization separation element $101_i$ is converted into P polarization by being transmitted through the second phase modulation element $103_i$ and the converted P polarization is input to the phase modulation element $102_{i+1}$ of the polarization element $110_{i+1}$. The converted P polarization is converted into S polarization by being transmitted through the phase modulation element $102_{i+1}$ of the polarization element $110_{i+1}$, and the converted S polarization is reflected at the polarization separation element $110_{i+1}$ and is converted into P polarization by being transmitted through the phase modulation element $102_{i+1}$ and the P polarization is converted again into S polarization by being transmitted through the second phase modulation element $103_i$ and the converted S polarization is output. The operations of the light flux $100_{i+1}$ input to the (i+1)$^{th}$ polarization element $110_{i+1}$ are the same as those described above. Since the plural polarization elements 110 are arrayed substantially parallel to each other, the transmission light and the reflection light are output in substantially the same direction.

As described above, in FIG. 22, the light fluxes 100, which are input randomly or as non-polarization to the polarization elements 110, are output as the S polarization. In addition, since the polarization separation element 101, and the phase modulation elements 102 and 103 have almost the same structure, manufacturing of them is easier than that shown in FIGS. 20 and 21, and the polarization conversion element shown in FIG. 22 is suitable for mass-production.

The polarization conversion element shown in FIG. 23 is a modified example of that shown in FIG. 22. That is, the polarization separation element 101 and the phase modulation element 102 are disposed in reverse to those shown in FIG. 22, and the output light is made P polarization. Except for the above description, the others are the same as those shown in FIG. 22.

Operations of the polarization conversion element shown in FIG. 23 are described hereafter. The light fluxes 100 are input to the corresponding polarization elements 110. The light flux $100_i$ input to the i$^{th}$ polarization element $110_i$ is transmitted through the second phase modulation element $103_i$ and the phase modulation element $102_i$ and is separated into S polarization being reflected by the polarization separation element $101_i$ and P polarization being transmitted through the polarization separation element $101_i$. The P polarization (transmission light) is output as it is. The S polarization reflected by the polarization separation element $101_i$ is converted into P polarization by being transmitted through the phase modulation element $102_i$ and the converted P polarization is converted into S polarization by being transmitted through the second phase modulation element $103_i$ and the S polarization is input to the polarization separation element $101_{i+1}$ of the polarization element $110_{i+1}$. The S polarization is reflected by the polarization separation element $101_{i+1}$ and is converted into P polarization by being transmitted again through the second phase modulation element $103_i$, and the converted P polarization is output. The operations of the light flux $100_{i+1}$ input to the (i+1)$^{th}$ polarization element $110_{i+1}$ are the same as those described above. Since the plural polarization elements 110 are arrayed substantially parallel to each other, the transmission light and the reflection light are output in substantially the same direction.

Figure 24:
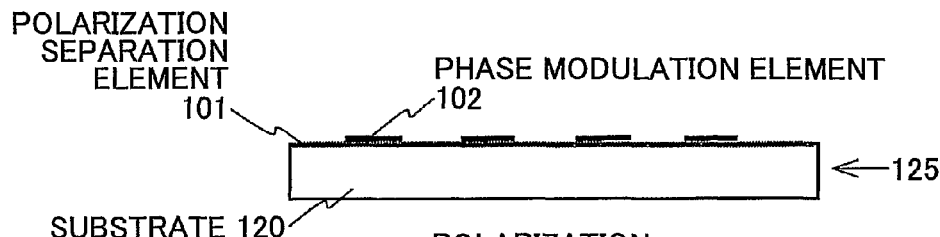
FIG. 24 is a diagram showing manufacturing processes of the polarization conversion element shown in FIG. 20.
Figure 24:
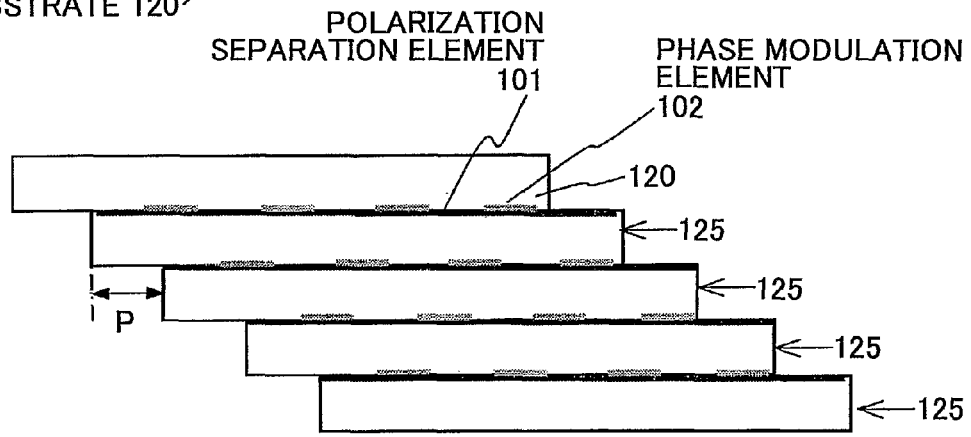
Figure 24:
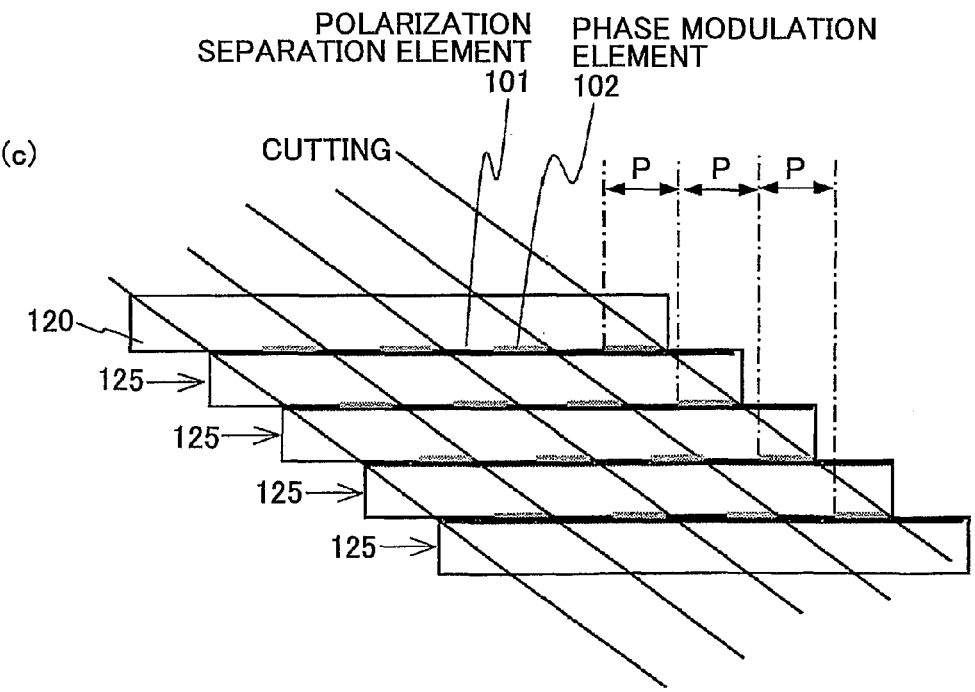

Next, manufacturing processes of the polarization conversion elements shown in FIGS. 20 and 22 are described. FIG. 24 is a diagram showing the manufacturing processes of the polarization conversion element shown in FIG. 20. In FIG. 24, (a) shows a first process, (b) shows a second process, and (c) shows a third process. First, in the first process shown in FIG. 24(a), a polarization separation film, which becomes the polarization separation elements 101, is formed on a plate-shaped substrate 120 (for example, made of glass) whose both surfaces are substantially parallel, and phase modulation function sections which become the phase modulation elements 102 are formed on the polarization separation film directly or via a buffer layer so that a section not having a phase modulation function is formed between the two adjacent phase modulation function sections with the same pitch. The phase modulation function sections are formed by bonding, for example, a reed-shaped film type ½ wavelength plate at the sections, or by bonding plural ½ wavelength plates on the polarization separation film. The buffer layer is formed between the polarization separation element 101 and the phase modulation elements 102 by an adhesive or by applying surface treatment to the polarization separation element 101 and/or the phase modulation elements 102 so that the adhesive strength between them is increased, if necessary or desired. In the first process, plural polarization element substrates 125 in which the polarization separation element 101 and the phase modulation elements 102 are formed are manufactured.

Next in the second process shown in FIG. 24(b), the plural polarization element substrates 125, in which the polarization separation element 101 and the phase modulation elements 102 are formed, are laminated by an adhesive by shifting each polarization element substrate 125 by a predetermined length P in the arraying direction of the phase modulation elements 102. In this, the surface of one polarization element substrate 125 where the polarization separation element 101 and the phase modulation elements 102 are formed is bonded on the surface of another polarization element substrate 125 where the polarization separation element 101 and the phase modulation elements 102 are not formed. In the bonding of the plural polarization element substrates 125, a thermosetting type adhesive is applied, a UV adhesive is coated, or hardening by ultraviolet rays is utilized. Even when small steps are formed on the polarization separation film by disposing the reed-shaped type ½ wavelength plates, the adhesive flattens the surface. The phase modulation elements 102 can be formed by an element having a phase modulation function by the structural birefringence. In this case, the thickness of the phase modulation element 102 can be ignored.

Next, in the third process shown in FIG. 24(c), the laminated plural polarization element substrates 125 are cut in parallel by slanting in the laminated direction by the predetermined length P, then, a polarization conversion element having a parallelogram shape is formed. Finally, a polarization conversion element having plural parallelogram blocks can be obtained by applying mirror finish on the cut surfaces.

In a structure in which reed-shaped wavelength plates are bonded on a substrate, there is a risk that burning occurs caused by low heat resistance of an adhesive. However, in the present embodiment, since the wavelength plates are formed with the polarization separation element on the substrate, the heat conductivity of the substrate becomes high and the heat resistance of the wavelength plates also becomes high. That is, the reliability of the polarization conversion element can be increased. The polarization conversion element shown in FIG. 21 can also be manufactured by processes similar to those described above.

Figure 25:
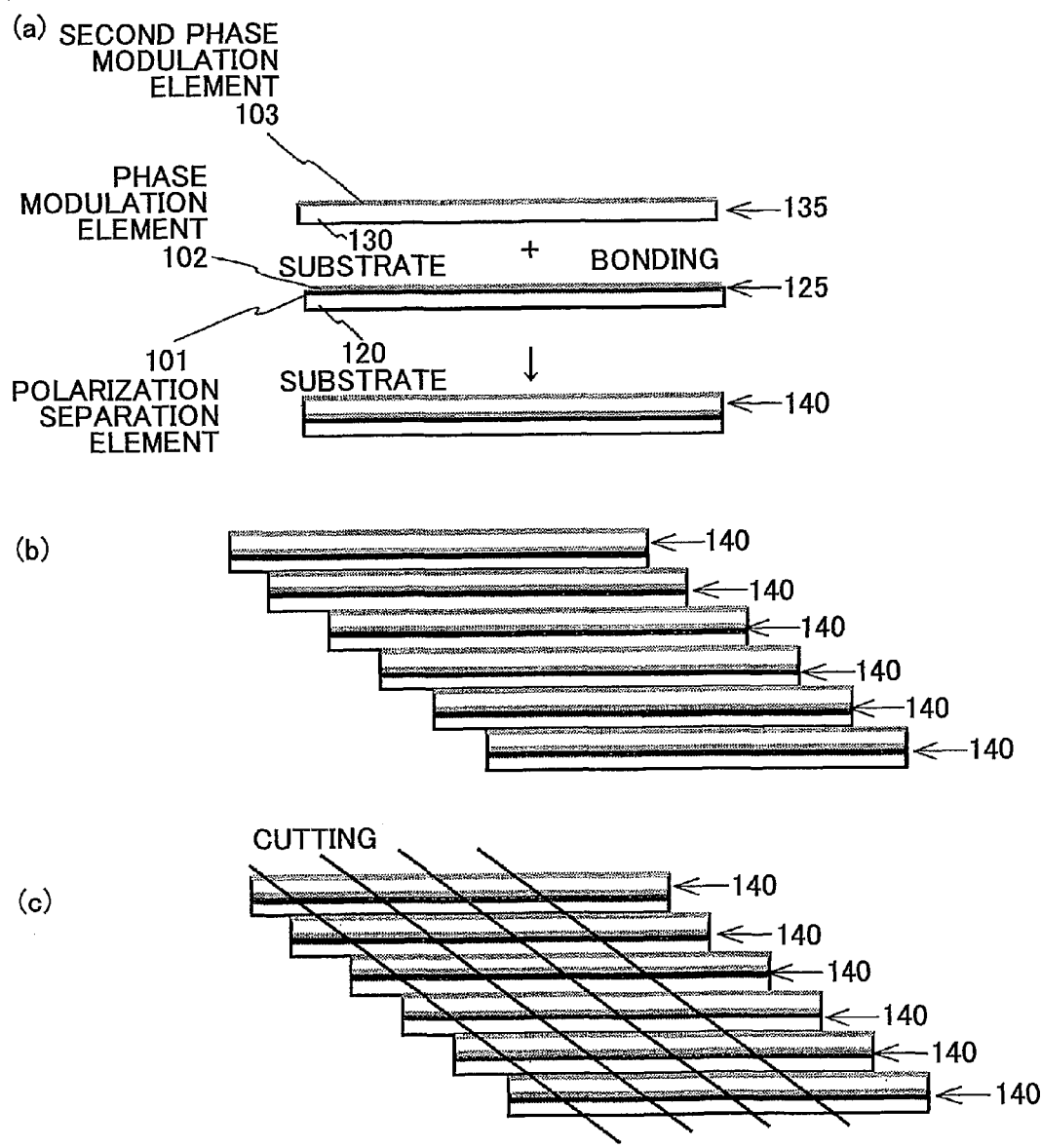
FIG. 25 is a diagram showing the manufacturing processes of the polarization conversion element shown in FIG. 22.

FIG. 25 is a diagram showing the manufacturing processes of the polarization conversion element shown in FIG. 22. In FIG. 25, (a) shows a first process, (b) shows a second process, and (c) shows a third process. First, in the first process shown in FIG. 25(a), a polarization separation film, which becomes the polarization separation elements 101, is formed on a plate-shaped substrate 120 (for example, made of glass) whose both surfaces are substantially parallel, and a phase modulation film which becomes the phase modulation elements 102 is formed on the polarization separation film; with this, a polarization element substrate 125 is formed. In this, the polarization element substrate 125 shown in FIG. 25 is not exactly the same as that shown in FIG. 24; however, the same reference number is used. Further, a phase modulation film which becomes the second phase modulation elements 103 is formed on a plate-shaped substrate 130 (for example, made of glass) whose shape and thickness are substantially the same as those of the plate-shaped substrate 120; with this, a phase modulation element substrate 135 is formed. Then, a stacked unit 140 is formed by bonding the phase modulation element substrate 135 on the phase modulation film of the polarization element substrate 125. As the phase modulation element 102 and the second phase modulation element 103, a ½ wavelength plate is preferable and the ½ wave length plate is simply stacked on the polarization separation film of the plate-shaped substrate 120 and on the plate-shaped substrate 130. Before the phase modulation element substrate 135 is bonded on the polarization element substrate 125, a buffer layer is formed, if necessary or desired. The buffer layer is formed between the polarization separation film and the phase modulation film and between the phase modulation film and the substrate by an adhesive or by applying surface treatment to the polarization separation film, the phase modulation film, and/or the substrate so that the adhesive strength between them is increased. In the first process, plural stacked units 140 in which the polarization conversion element substrate 125 and the phase modulation element substrate 135 are stacked are manufactured.

Next in the second process shown in FIG. 25(b), the plural stacked units 140 are laminated by an adhesive. In the lamination of the plural stacked units 140, a thermosetting type adhesive is applied, a UV adhesive coating is applied, or hardening by ultraviolet rays is utilized. In the laminating process, the plural stacked units 140 are laminated by shifting each stacked unit 140 by a predetermined length in the extending direction of the stacked unit 140 so that the lower surface of the plate-shaped substrate 120 of one stacked unit 140 is bonded on the phase modulation film of another stacked unit 140.

Next, in the third process shown in FIG. 25(c), the laminated plural stacked units 140 are cut in parallel by slanting in the laminated direction by the predetermined length, then, a polarization conversion element having a parallelogram shape is formed. Finally, a polarization conversion element having plural parallelogram blocks can be obtained by applying mirror finish on the cut surfaces.

As described above, as shown in FIG. 25, in the manufacturing processes of the polarization conversion element shown in FIG. 22, the reed-shaped ½ wavelength pates are not needed, and basically, the polarization separation film and the phase modulation film are formed. Therefore, the manufacturing processes are simple. In this, when the order of forming the polarization separation film and the phase modulation film on the plate-shaped substrate 120 in the polarization element substrate 125 is reversed, the polarization conversion element shown in FIG. 23 is formed.

In addition, as described in the manufacturing processes of the polarization conversion element shown in FIG. 20, in the structure in which the reed-shaped wavelength plates are bonded on the substrate, there is a risk that burning occurs caused by low heat resistance of an adhesive. However, in the present embodiment, since the wavelength plate is formed with the polarization separation element on the substrate, the heat conductivity of the substrate becomes high and the heat resistance of the wavelength plate also becomes high. That is, the reliability of the polarization conversion element can be increased. In addition, since the phase modulation element substrate 135 and the polarization element substrate 125 have the same pattern, the mass-production of the polarization conversion element can be easily realized.

In the polarization conversion elements shown in FIGS. 20 through 23, as shown in FIGS. 13 and 14, light blocking plates (films) can be formed on the surface of polarization conversion element where the light fluxes are input. In addition, as shown in FIGS. 15 through 18, the polarization conversion elements can be arrayed in central symmetry.

Figure 26:
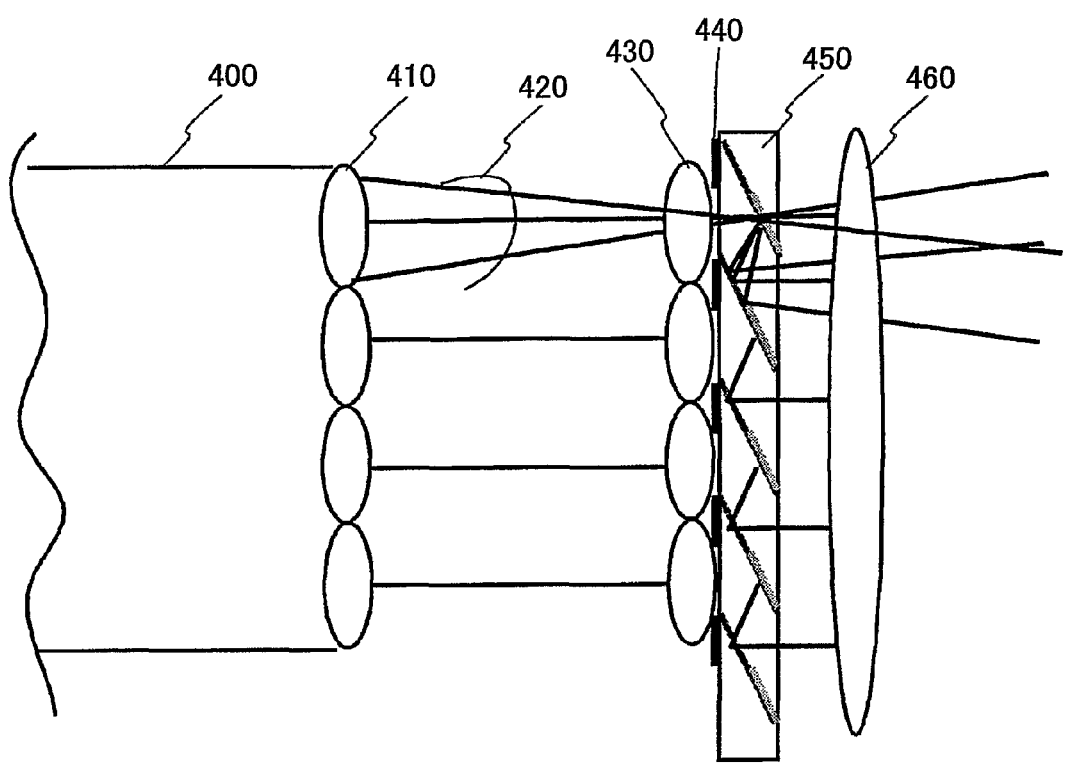
FIG. 26 is a diagram showing a polarization conversion optical system (illumination system) using the polarization conversion element shown in FIG. 20.

Next, an example in which a polarization conversion element is used in a polarization conversion optical system is described. FIG. 26 is a diagram showing a polarization conversion optical system (illumination system) using the polarization conversion element shown in FIG. 20. In FIG. 26, the polarization conversion element shown in FIG. 20 is used; however, an arbitrary polarization conversion element can be used in the illumination system.

In FIG. 26, a light flux 400 from a light source is divided into plural light fluxes 420 by a condenser element 410. The condenser element 410 is one element in the illumination system which element unifies a light flux form a single light source, and is generally a fly-eye lens (or a lenticular lens array) in which a lens array is two-dimensionally disposed. Two fly-eye lenses 410 and 430 are used, and the second fly-eye lens 430 is disposed near a light condensing point (pupil position) of the first fly-eye lens 410 (condenser element), then plural images of a single light source are formed. The plural images become secondary point light sources. The secondary point light sources are formed in an array corresponding to the array pitch of the second fly-eye lens 430. The plural point light sources are irradiated on an object to be irradiated by using a condenser lens 460 and so on. Then uniform illumination is obtained. This kind of illumination system is used in an illumination apparatus such as an exposure and a projector which may need uniform illumination.

As described in FIGS. 15 and 17, in the illumination system, in order to efficiently cause divided plural illumination fluxes to be light fluxes of one polarization direction, a polarization conversion element 450 according to the embodiments of the present invention is used. In addition, light blocking sections 440 are disposed on the light flux input side of the polarization conversion element 450. This is the same as that shown in FIG. 17.

In a conventional illumination system, since the polarization conversion element shown in FIG. 29A or 29B is disposed, twice as many polarization conversion sections as the number of divided light fluxes are required. However, in the present invention, the number of the polarization conversion sections is the number of the divided light fluxes. Strictly, as shown in FIG. 26, it is enough that five polarization conversion sections (polarization elements) are needed for four light fluxes 420. That is, one polarization conversion section is added for the number of the illumination light fluxes.

The number of the illumination light fluxes shown in FIG. 26 is an example and is actually the number of required light fluxes. The number of the polarization conversion sections is determined based on the number of the light fluxes.

As described above, according to the embodiments of the present invention, the number of the arraying polarization conversion sections (polarization elements) in the polarization conversion element is smaller than that in the conventional illumination system. Therefore, the illumination system according to the embodiments of the present invention can be formed at low cost. In addition, since the arraying number is small, that is, the arraying pitch becomes relatively large; therefore, pitch errors and disposing errors of the polarization conversion sections become small and an illumination system having high polarization conversion efficiency can be realized. In addition, in order to realize an illumination system in which the polarization direction is made one direction, in FIG. 26, the light blocking sections 440 are disposed on the light flux input side of the polarization conversion element 450. Conventionally, due to the aberration around the condenser element and the size limitation of the light source, the condensing ability is degraded and the polarization is also degraded by a light flux input from a position other than the input position to the polarization conversion element. However, when the light blocking sections 440 are disposed, an illumination system having high polarization can be realized.

When the polarization conversion element according to the embodiments of the present invention is disposed in an illumination system, an image projection apparatus in which the illumination system is disposed can be realized. That is, the illumination system (polarization conversion optical system) using the polarization conversion element according to the embodiments of the present invention can be applied to the image projecting apparatuses shown in FIGS. 27 and 28. When the polarization conversion element is used in the image projecting apparatus, whether P polarization or S polarization is used depends on polarization dependency of an image forming element such as a liquid crystal element, and the polarization direction is determined by the characteristics of the image forming element.

Further, the present invention is not limited to these embodiments, but various variations and modifications may be made without departing from the scope of the present invention.

The patent application is based on Japanese Priority Patent Application No. 2005-237496 filed on Aug. 18, 2005, and Japanese Priority Patent Application No. 2006-158217 filed on Jun. 7, 2006, with the Japanese Patent Office, the entire contents of which are hereby incorporated by reference.

The invention claimed is:

1. A polarization conversion element, comprising:
a plurality of polarization separation sections;
a plurality of phase modulation sections, wherein a light flux that is input to each of the plurality of polarization separation sections is separated into transmission light and reflection light, and the reflection light of one polarization separation section is reflected again at a position of an adjacent polarization separation section, the position of the adjacent polarization separation section being different from a position where an adjacent light flux is input to the adjacent polarization separation section, and wherein each reflection light is output in substantially a same direction as that of the transmission light, and the phase modulation sections are disposed either on light paths of the transmission light or on light paths of the reflection light; and
a plurality of parallelogram blocks whose surface to which light is input and whose surface from which the light is output are orthogonal to a light flux input axis and whose bonding surface to an adjacent parallelogram block has a gradient of approximately 60° relative to the light flux input axis, wherein each of the polarization separation sections is respectively disposed on the bonding surface of each of the parallelogram blocks and each of the phase modulation sections is respectively disposed parallel to each of the polarization separation sections so as to respectively face approximately a left-half region of an upper surface of each of the polarization separation sections of each of the parallelogram blocks.

* * * * *

UNITED STATES PATENT AND TRADEMARK OFFICE
CERTIFICATE OF CORRECTION

| | | |
|---|---|---|
| PATENT NO. | : 7,995,275 B2 | Page 1 of 1 |
| APPLICATION NO. | : 11/665619 | |
| DATED | : August 9, 2011 | |
| INVENTOR(S) | : Ikuo Maeda et al. | |

It is certified that error appears in the above-identified patent and that said Letters Patent is hereby corrected as shown below:

On the title page, Item (86), the PCT No. is incorrect. Item (86) should read:

-- (86) PCT No.: PCT/JP2006/316276

§ 371 (c)(1),
(2), (4) Date: Apr. 18, 2007 --

Signed and Sealed this
Eighth Day of November, 2011

David J. Kappos
*Director of the United States Patent and Trademark Office*